US011303352B2

(12) United States Patent
Ravishankar et al.

(10) Patent No.: US 11,303,352 B2
(45) Date of Patent: Apr. 12, 2022

(54) SYSTEMS AND METHODS OF PAGING IN GEO SATELLITE-BASED 5G NETWORKS

(71) Applicant: Hughes Network Systems, LLC, Germantown, MD (US)

(72) Inventors: Channasandra Ravishankar, Clarksburg, MD (US); Gaguk Zakaria, College Park, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 21 days.

(21) Appl. No.: 16/884,886

(22) Filed: May 27, 2020

(65) Prior Publication Data

US 2021/0105065 A1 Apr. 8, 2021

Related U.S. Application Data

(60) Provisional application No. 62/910,437, filed on Oct. 3, 2019.

(51) Int. Cl.
*H04B 7/185* (2006.01)
*H04W 8/08* (2009.01)
(Continued)

(52) U.S. Cl.
CPC ....... *H04B 7/18532* (2013.01); *H04B 7/1855* (2013.01); *H04W 8/08* (2013.01); *H04W 48/16* (2013.01); *H04W 68/005* (2013.01)

(58) Field of Classification Search
CPC . H04W 60/00; H04W 72/1231; H04W 64/00; H04W 4/029; H04W 52/0261; H04W 12/08; H04W 8/12
(Continued)

(56) References Cited

U.S. PATENT DOCUMENTS 5,913,164 A * 6/1999 Pawa ................. H04B 7/18567
455/427
6,072,986 A * 6/2000 Blanchard .......... H04B 7/18532
340/7.32
(Continued)

FOREIGN PATENT DOCUMENTS

WO WO2020062092 A1 * 2/2020
WO WO-2021067803 A1 * 4/2021 .............. H04W 8/08

OTHER PUBLICATIONS

EE Standard for Local and Metropolitan Area Networks—Part 16: Air Interface for Fixed and Mobile Broadband Wireless Access Systems—Amendments: Management Plane Procedures and Services Published in: IEEE Std 802.16g 2007 (Amendment to IEEE Std 802.16-2004) (pp. 1-200) Dec. 2007 (Year: 2007).*
(Continued)

*Primary Examiner* — William D Cumming
(74) *Attorney, Agent, or Firm* — NovoTechIP International PLLC

(57) ABSTRACT

Systems and methods implementing a satellite radio access network (SRAN) receiving a registration request from a user terminal (UT), determining a current tracking area (TA) of the UT, forwarding the registration request and the current TA to an access and mobility management function (AMF), and receiving a registration accept from the AMF that indicates a UT registration area. An implementation receives a UT page command from the AMF and, in response, determines a satellite beam for paging the UT, from among a plurality of satellite beams using the identifier of the current TA, and pages the UT on the satellite beam.

17 Claims, 14 Drawing Sheets

(51) Int. Cl.
*H04W 48/16* (2009.01)
*H04W 68/00* (2009.01)

(58) Field of Classification Search
USPC .......... 455/435.1, 436.2, 433, 411, 427, 428, 455/456.2; 370/336, 311; 340/7.32
See application file for complete search history.

(56) References Cited

U.S. PATENT DOCUMENTS

| | | | | |
|---|---|---|---|---|
| 7,974,619 B2* | 7/2011 | Dutta | ...................... | H04W 8/12 |
| | | | | 455/428 |
| 8,175,598 B2* | 5/2012 | Kubo | ................... | H04W 60/00 |
| | | | | 455/435.1 |
| 9,585,017 B2* | 2/2017 | Fox | ...................... | H04W 60/00 |
| 10,116,380 B1* | 10/2018 | Freedman | .......... | H04B 7/18519 |
| 10,244,457 B1* | 3/2019 | Santhanam | ............. | H04W 8/30 |
| 10,448,252 B2* | 10/2019 | Fox | ...................... | H04W 68/04 |
| 10,813,078 B2* | 10/2020 | Ravishankar | ......... | H04W 4/029 |
| 2005/0090256 A1* | 4/2005 | Dutta | ...................... | H04W 8/12 |
| | | | | 455/435.2 |
| 2010/0255841 A1* | 10/2010 | Kubo | ................... | H04W 60/00 |
| | | | | 455/435.1 |
| 2011/0077002 A1* | 3/2011 | Dutta | ................ | H04B 7/18545 |
| | | | | 455/427 |
| 2011/0263274 A1* | 10/2011 | Fox | ...................... | H04W 60/00 |
| | | | | 455/456.2 |
| 2011/0289511 A1* | 11/2011 | van der Veen | .......... | G06F 9/526 |
| | | | | 718/106 |
| 2012/0033651 A1* | 2/2012 | Dinan | ............... | H04W 72/1231 |
| | | | | 370/336 |
| 2012/0079385 A1* | 3/2012 | Ellis | .................. | H04N 21/4825 |
| | | | | 715/719 |
| 2012/0142344 A1* | 6/2012 | Lamba | .................. | H04W 64/00 |
| | | | | 455/433 |
| 2012/0147800 A1* | 6/2012 | Park | .................. | H04W 52/0261 |
| | | | | 370/311 |
| 2012/0149369 A1* | 6/2012 | Lamba | ................. | H04W 4/029 |
| | | | | 455/433 |
| 2014/0286217 A1* | 9/2014 | Park | .................. | H04W 52/0261 |
| | | | | 370/311 |
| 2014/0295796 A1* | 10/2014 | Fox | ...................... | H04W 60/00 |
| | | | | 455/411 |
| 2017/0257766 A1* | 9/2017 | Fox | ...................... | H04W 12/08 |
| 2018/0115884 A1* | 4/2018 | Cuevas Ramirez | .. | H04W 48/16 |
| 2018/0227533 A1* | 8/2018 | Ellis | ..................... | H04N 21/431 |
| 2019/0075504 A1* | 3/2019 | Santhanam | ........... | H04W 4/022 |
| 2019/0268874 A1* | 8/2019 | Ravishankar | ......... | H04W 4/029 |
| 2020/0236321 A1* | 7/2020 | Ellis | ................... | H04N 21/4586 |
| 2020/0275257 A1* | 8/2020 | Gupta | ...................... | H04W 8/08 |
| 2021/0105065 A1* | 4/2021 | Ravishankar | ....... | H04W 68/005 |
| 2021/0105693 A1* | 4/2021 | Tripathi | ................ | H04W 4/029 |
| 2021/0143897 A1* | 5/2021 | Edge | ..................... | H04W 36/30 |
| 2021/0143898 A1* | 5/2021 | Edge | .................. | H04W 12/037 |
| 2021/0143900 A1* | 5/2021 | Edge | ..................... | H04W 64/00 |
| 2021/0144669 A1* | 5/2021 | Edge | ...................... | H04W 8/26 |
| 2021/0218467 A1* | 7/2021 | Jin | ..................... | H04B 7/18513 |
| 2021/0242933 A1* | 8/2021 | Edge | ..................... | H04W 12/08 |

OTHER PUBLICATIONS

H.-L. Maattanen et al., "5G NR Communication over GEO or LEO Satellite Systems: 3GPP RAN Higher Layer Standardization Aspects," 2019 IEEE Global Communications Conference (GLOBECOM), Dec. 2019, pp. 1-6, doi: 10.1109/GLOBECOM38437.2019.9014090. (Year: 2019).*

"3rd Generation Partnership Project; Technical Specification Group Radio Access Network; Solutions for NR to support non-terrestrial networks (NTN) (Release 16)"; 3GPP Technical Report; Jun. 13, 2019; pp. 1-15.

Hughes Networks System Ltd; "Methods of Paging in GEO Satellite-Based 5G Networks"; 3GPP RAN WG2 Meeting #107bis, Chongqing, China; Oct. 4, 2019; pp. 1-6.

Hughes; "NR-NTN: Paging in NGSO Satellite Systems"; 3GPP TSG RAN WG3 Meeting #101, Gothernburg, Sweden; Aug. 10, 2018; pp. 1-6.

International Search Report and Written Opinion dated Dec. 9, 2020 by the International Searching Authority (European Patent Office) in PCT Application PCT/US2020/054066.

Thales et al.; "NR-NTN: Preliminary solutions for NR to support non-terrestrial networks"; 3GPP TSG RAN Meeting #80, La Jolla, USA; Jun. 4, 2018; pp. 1-16.

Vodafone; "Tracking Area considerations for Non Terrestrial Networks (NTN)"; 3GPP TSG RAN WG2 Meeting #105 bis, Xi'An, People's Republic of China; Apr. 6, 2019; pp. 1-9.

* cited by examiner

SYSTEMS AND METHODS OF PAGING IN GEO SATELLITE-BASED 5G NETWORKS

CROSS REFERENCE TO RELATED APPLICATION

This application claims the benefit of priority from U.S. Provisional Patent Application Ser. No. 62/910,437, filed Oct. 3, 2019, and titled "METHODS FOR PAGING IN GEO SATELLITE-BASED 5G NETWORKS," which is incorporated by reference herein in its entirety.

BACKGROUND

A Geosynchronous Equatorial Orbit (GEO) Satellite based 5G system may be deployed, for example, as part of a 5G system (5GS). In 5GS protocol, a user terminal (UT) can register with a Core Network (CN), and the registration process can include the CN providing the UT a registration area (RA). The RA is a collection of radio cells, each mutually adjacent to at least one other among the collection. As each cell is covered by a corresponding spot beam, the RA also defines a collection of spot beams. From the UT's perspective the RA defines an area in which the UT, when in its Connection Management (CM)-IDLE state, can move without having to notify the network. Since the notifications impose a signaling load, the allowing of the UT to move among multiple cells without notifying the network reduces signaling load on the system.

Communication functionality of a UT in CM-IDLE state, though, can be limited. For example, a CM-IDLE state UT cannot generally receive data packets. Therefore, when the 5G CN receives communication data for transmission to a CM-IDLE state UT, the Access and Mobility Management Function (AMF) must first send a page signal to the UT. The page signal, when received at the UT, causes the UT to switch to an active state to receive the data. When the UT is in CM-Idle state, though, the granularity of the AMF's knowledge of the UT's location is at the RA level. If the RA includes multiple cells, the AMF does not know which of the cells the UT is located in. Therefore, the page must be sent to all the RA's cells. Accordingly, for each of the multiple cells, the satellite radio access network (SRAN) that serves the cell sends the page signal, on an uplink to a satellite, for downlink transmission onto the spot beam that covers the cell. In satellite based 5G systems, this multi-cell, i.e., multi-beam, paging requirement can incur costs, in terms of satellite system bandwidth and system power.

Another cost in satellite based 5G systems relates to system overhead costs, and UT power and resource overhead costs of UT registration updates.

Accordingly, what is needed is a satellite based 5G system and method that can provide, among other features, reduced overhead/power paging of 5G UTs and, in some configurations, reduced overhead location reporting by 5G UTs.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

SUMMARY

Figure 1A:
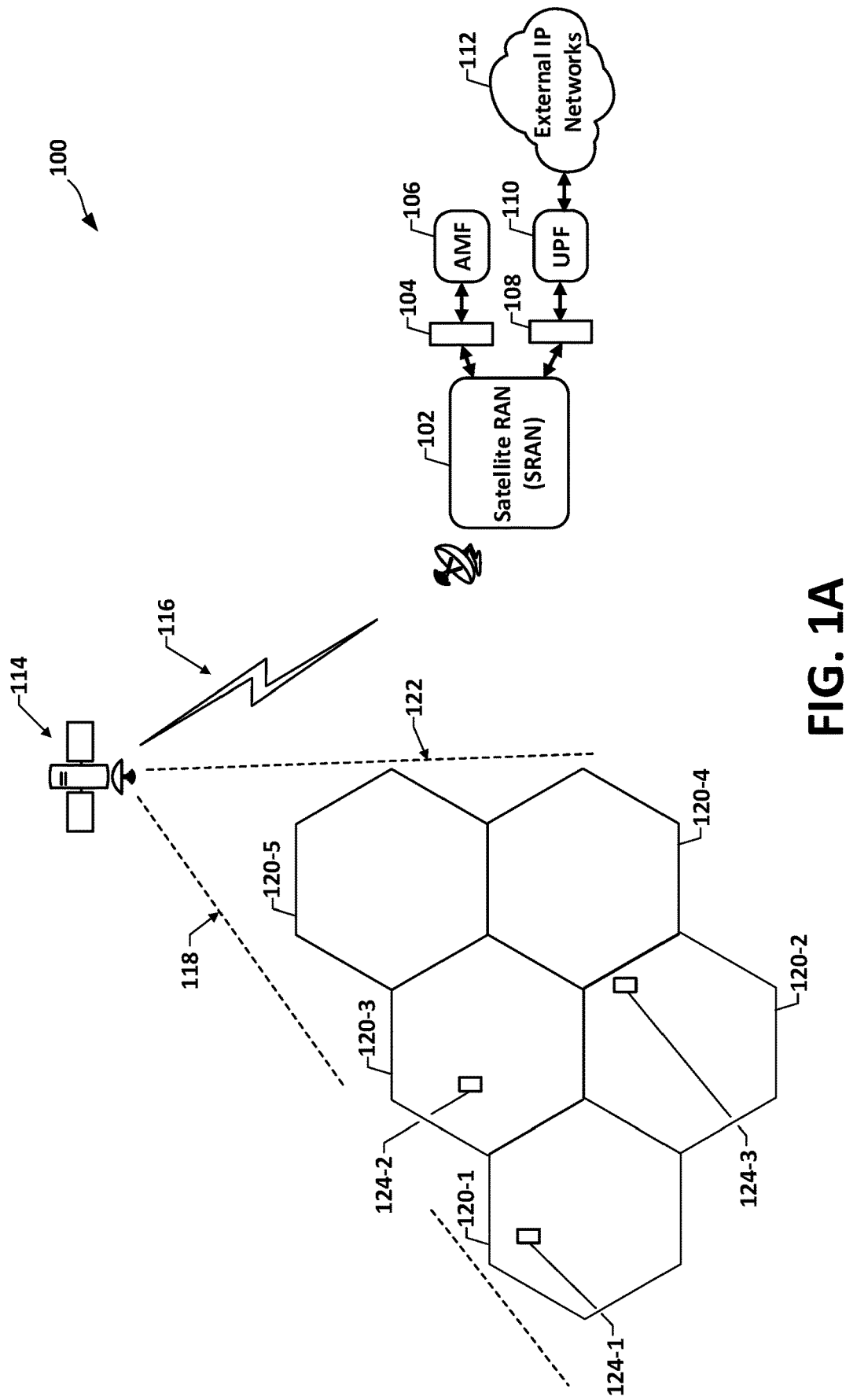
FIG. 1A is a high level schematic of an example satellite-based 5G system and interfacing core 5G.

This Summary identifies example features and aspects and is not an exclusive or exhaustive description of the disclosed subject matter. Whether features or aspects are included in or omitted from this Summary is not intended as indicative of relative importance of such features. Additional features and aspects are described, and others will become apparent to persons skilled in the art upon reading the following detailed description and viewing the drawings that form a part thereof.

An example of disclosed systems can include an SRAN, which can include a processor; and a memory that can be communicatively connected to the processor, and can store executable instructions that when executed by the processor cause the processor to receive a registration request from a UT and, in response, determine a current TA in which the UT is located, based at least in part on a content of the registration request, and send the registration request and an identification of the current TA to an AMF. The executable instructions can further include instructions that when executed by the processor can cause the processor to receive a registration accept from the AMF and, in response, forward the registration accept to the UT, the registration accept indicating a registration area for the UT; and instructions that when executed can cause the processor to receive from the AMF a page command for the UT and, in response to determine a satellite beam for paging the UT, from among a plurality of satellite beams, based at least in part on the identifier of the current TA, and page the UT on said satellite beam for paging the UT.

An example of disclosed methods can include a method for satellite-based 5G resource conserving paging, comprising: receiving, by an SRAN, a registration request from a UT; determining a current TA in which the UT is located, based at least in part on a content of the registration request; sending, from the SRAN to an AMF, the registration request and an identification of the current TA; and can include receiving a registration accept from the AMF, indicating a registration area for the UT, and forwarding the registration accept to the UT; receiving from the AMF a UT page command and, in response, determining a satellite beam for paging the UT, from among a plurality of satellite beams, based at least in part on the identifier of the current TA, and paging the UT on said satellite beam for paging the UT.

DETAILED DESCRIPTION

In the following detailed description, numerous specific details are set forth by way of examples to provide a thorough understanding of the disclosed subject matter. It may become apparent to persons of ordinary skill in the art, though, upon reading this disclosure, that one or more disclosed aspects may be practiced without such details. In addition, description of various example implementations according to this disclosure may include referencing of or to one or more known techniques or operations, and such referencing can be at relatively high-level, to avoid obscuring of various concepts, aspects and features thereof with details not particular to and not necessary for fully understanding the present disclosure.

As used in this disclosure, the terms "cell," "beam" and "spot beam" are interchangeable, as each cell is covered by, i.e., is within one spot beam and each spot beam covers one cell. The cell can be uniquely identified by the SRAN from which the UT receives radio signals.

As used in this disclosure, the phrase "based on" will be understood to mean based at least in part on, except where otherwise stated or made clear from the context to have a different meaning.

Systems and methods according to this disclosure can provide TA level tracking of CM-Idle state UTs, combined with TA-based single beam selection and single beam paging of CM-Idle state UTs, instead of current paging of a subject CM-Idle-state UT, which is on all beams covering any portion of the subject UT's current RA. In an implementation, features in the TA-based tracking can include a particular initial registration. In the initial registration, an SRAN can receive a registration request from a subject UT and, in response, can determine the current TA in which the requesting UT is located. In an aspect, the determination can be based, at least in part, on a content of the registration request. An initial registration can also include sending, from the SRAN to the AMF, the registration request and an identification of the determined current TA, followed by receiving at the SRAN a registration accept from the AMF, the registration accept indicating a registration area for the UT, whereupon the SRAN can forward the registration accept to the UT. In an implementation, after the subject UT has switched to CM-Idle state, paging of the UT can include receiving at the SRAN from the AMF a UT page command that identifies the subject UT. The paging can also include the SRAN, in response to the paging command, looking up or otherwise identifying the UT's current TA, followed by the SRAN selecting, for the paging, one beam among a plurality of beams, namely, the beam that covers the identified TA.

An example implementation can additionally or alternatively include a particularly configured UT, a particularly configured SRAN, or both, wherein the UT, before sending a registration request, can send the SRAN a location report that includes the UT's location. The particularly configured SRAN, in response to the location report, can determine the UT's current TA and send the TA to the UT in a location accept. The particularly configured UT can subsequently include, e.g., in its initial registration request to the SRAN, the TA earlier received from the SRAN. The SRAN can forward the registration request, together with its included TA, to the AMF. In an aspect, the UT can encrypt its location in the location report message. This can provide security against a man-in-the-middle determining the UT location.

In another example implementation, the AMF can be particularly configured, or both the SRAN and the AMF can be particularly configured to maintain, in the AMF, an updated TA-level indication of a CM-IDLE state UT. Technical features can include offloading of processing and storage of per UT current TA, from the SRAN to the AMF.

FIG. 1A is a high-level schematic of an example satellite-based 5G system (hereinafter "system 100"). The system 100 can include an SRAN 102 that can be communicatively connected via a first interface 104 to an AMF 106, and communicatively connected via a second interface 108 to a 5G User Plane Function (UPF) 110, which accesses external IP networks 112. The first interface 104 can be, for example, a 5G N2 standard interface, and the second interface 108 can be, for example, a 5G N3 standard interface.

The system 100 can include a GEO satellite 114, or other elevated altitude radio frequency (RF) transceiver/receiver. The SRAN 102 can transmit various content and control data to the GEO satellite 114 over a forward uplink (not separately visible) resource of a two-way "feeder link" 116. The GEO satellite 114 can, in turn, provide two-way "service links" 118 (not individually visible in FIG. 1A) within a pattern of spot beams the satellite 114 establishes over a service area (not separately labeled in FIG. 1). The pattern of spot beams forms a corresponding pattern of cells, such as the FIG. 1A pattern that includes a first cell 120-1, second cell 120-2, third cell 120-3, and fourth cell 120-4 (hereinafter collectively "cell(s) 120"). The pattern of spot beams can be configured such that the cells 120 are hexagonal, as visible in FIG. 1A. Interface between the feeder link 116 and service links 118 can be provided by satellite air interface 122. One example satellite air interface 122 can be GMR-1 3G, which is an evolution of the GMR-1 air interface standards; GMR-1 3G has been adopted as a mobile satellite system standard by the European Telecommunications Standards Institute (ETSI) and the International Telecommunications Union (ITU).

FIG. 1A shows three UTs, numbered respectively as UT 124-1, UT 124-2, and UT 124-3 (collectively "UTs 124"). The visible population of three UTs 124 is only for illustration, and can be representatives from a much larger population of UTs (not explicitly visible in FIG. 1). The UTs 124 can be mobile, e.g., placed on, or otherwise supported by a vehicle, aircraft, ship, boat, or other means of transport or conveyance.

Figure 1B:
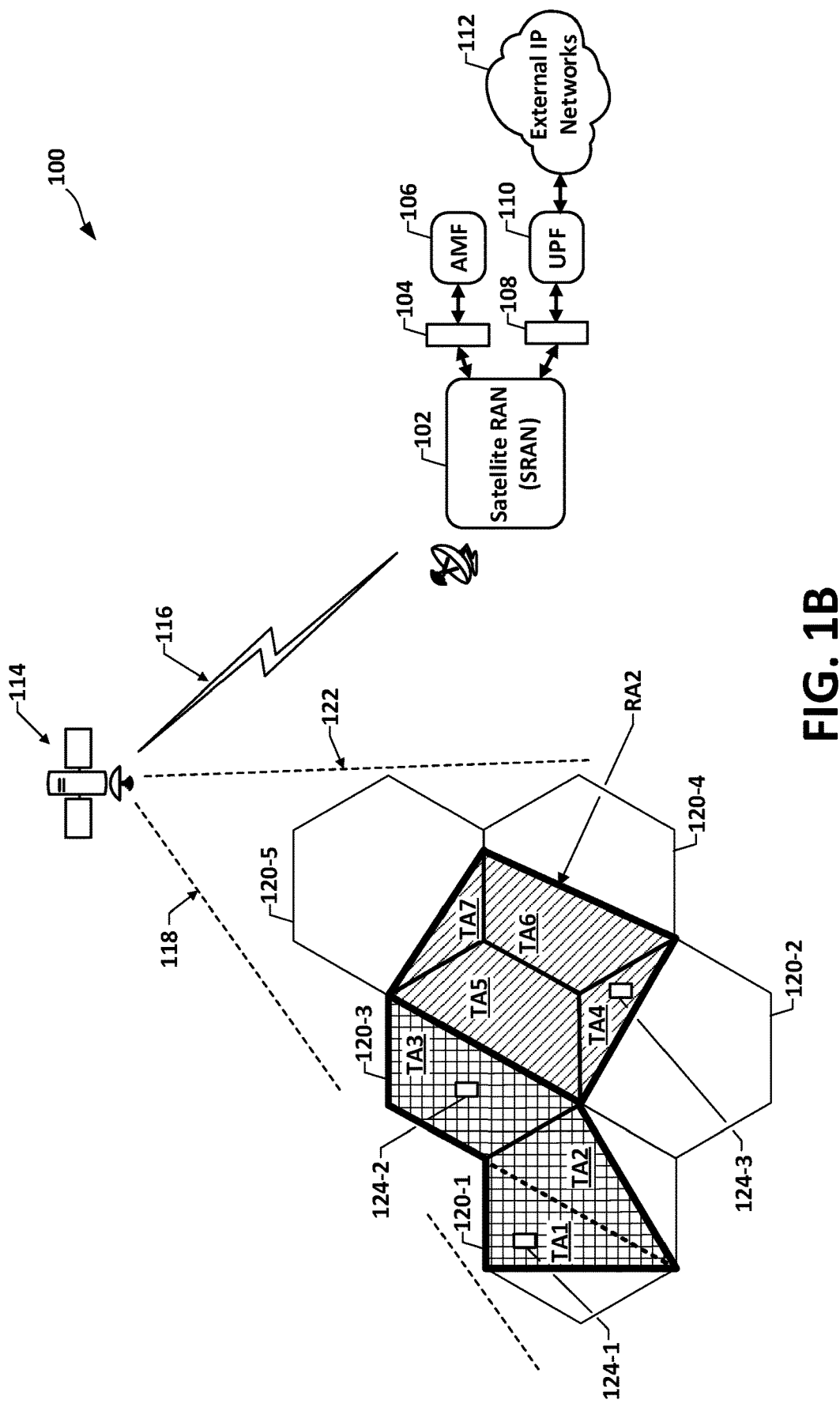
FIG. 1B is a graphical overlay, onto cells of the FIG. 1A system, of an example configuration of registration areas (RAs), each comprising an example configuration of constituent tracking areas (TAs).

FIG. 1B shows a graphical overlay on the FIG. 1A cells 120 of an example configuration of RAs, each RA being formed of a particular set of TAs. In the example configuration, a first list or set of TAs, visible in FIG. 1B as "TA1," "TA2," and "TA3," are a first RA, labeled "RA1." A second set of TAs, visible in FIG. 1B as "TA4," "TA5," "TA6," and "TA7," are a second RA, which is labeled "RA2." The TAs forming RA1 result in RA1 extending over or into multiple cells, these being the first cell 120-1 and a portion of the third cell 120-3. The TAs forming RA2 result in RA2 also extending over or into multiple cells, these being the second cell 120-2, fourth cell 102-4, and fifth cell 120-5.

For purposes of description, TA1, TA2, and TA3 will be alternatively referenced, respectively, as "first RA first TA," "first RA second TA," and "first RA third TA." Tracking areas TA4, TA5, TA6, and TA7 will be alternatively referenced, respectively, as "second RA first TA," "second RA second TA," "second RA third TA," and "second RA fourth TA." For convenience the first RA first TA, second TA, and third TA will be alternatively recited, respectively, as "RA1/TA1," "RA1/TA2," and "RA1/TA3." Likewise, the second RA first TA, second TA, third TA, and fourth TA." will be alternatively recited, respectively, as "RA2/TA4," "RA2/TA5," "RA2/TA6," and "RA2/TA7."

As described above, the UTs 124 can be mobile, and the locations visible in FIG. 1B of the UTs 124 relative to the example RAs and TAs can be a snapshot state. The FIG. 1B state includes UT 124-1 being located in RA1/TA1, UT 124-2 located in RA1/TA3, and UT 124-2 located in the RA2/TA4. In an operation of the system 100, each of the UTs 124 can register with AMF 106. Each of the UTs 124 can also re-register, for example, in response to the UT moving a threshold distance from the location at which it most recently registered. An example UT 124 registration can include the UT transmitting a registration request message to the SRAN 102, or other SRAN (not visible in FIG. 1) serving the cell in which the UT 124 is located. The SRAN 102 can forward the registration request to the AMF 106, along with identifiers of the UT 124's current TA and current cell identifier. The AMF 106, in response, can assign the requesting UT an RA, i.e., a particular set of TAs within which the UT 124 can move while in the CM-IDLE state without needing to inform the network. In the FIG. 1B configuration, an example RA assignment can be one among RA1 and RA2. The AMF 106 communication of the assignment can include an identifier of the assigned RA, and a list of the RA's TAs.

Each of the UTs 124 can be RRC Active upon completion of the registration and, as such, can receive data from the AMF 106 received from the core network elements. Each UT 124 can also switch from RRC Active to the CM-IDLE state, for example, in response to detecting inactivity. As also described above, the UT 124 in the CM-IDLE state generally cannot receive data transmission. Therefore, for data to be delivered to a UT 124 currently in the CM-IDLE state, the AMF 106 must first page the UT. The AMF, though, only knows the RA in which CM-IDLE state UT 124 is located. The AMF 106 must therefore send the page signal to all SRANs having jurisdiction of any of the cells into which the UT 124's current assigned RA extends. This incurs costs in satellite system bandwidth and system power.

As illustration of such costs, an example will assume UT 124-3 has registered, and its assigned TAs are the TAs forming RA2, and UT 124-3 has switched to the CM-IDLE state, and a data addressed to UT 124-3 arrives at the AMF 106, e.g., via the UPF 110 and second interface 108, while the UT is in the CM-IDLE state. Since UT 124-3 is in the CM-IDLE state, the AMF 106 must first page UT 124-3 to cause the UT to switch to the CM-CONNECTED/RRC-Active state to receive the data. The AMF 106, however, does not know which of the four TAs of RA2 in which UT 124-3 is located, i.e., does not know UT 124-3 is located in RA2/TA4. The AMF 106 only knows that the CM-IDLE state UT 124-3 is in RA2. Therefore, the AMF 106 page of UT 124-3 causes the SRAN 102 to send a page to all 4 of the cells 120 into which RA2 extends, i.e., second cell 120-2, third cell 120-3, fourth cell 12-4, and fifth cell 120-5. This is a non-productive expenditure of system 100 resources.

Figure 2:
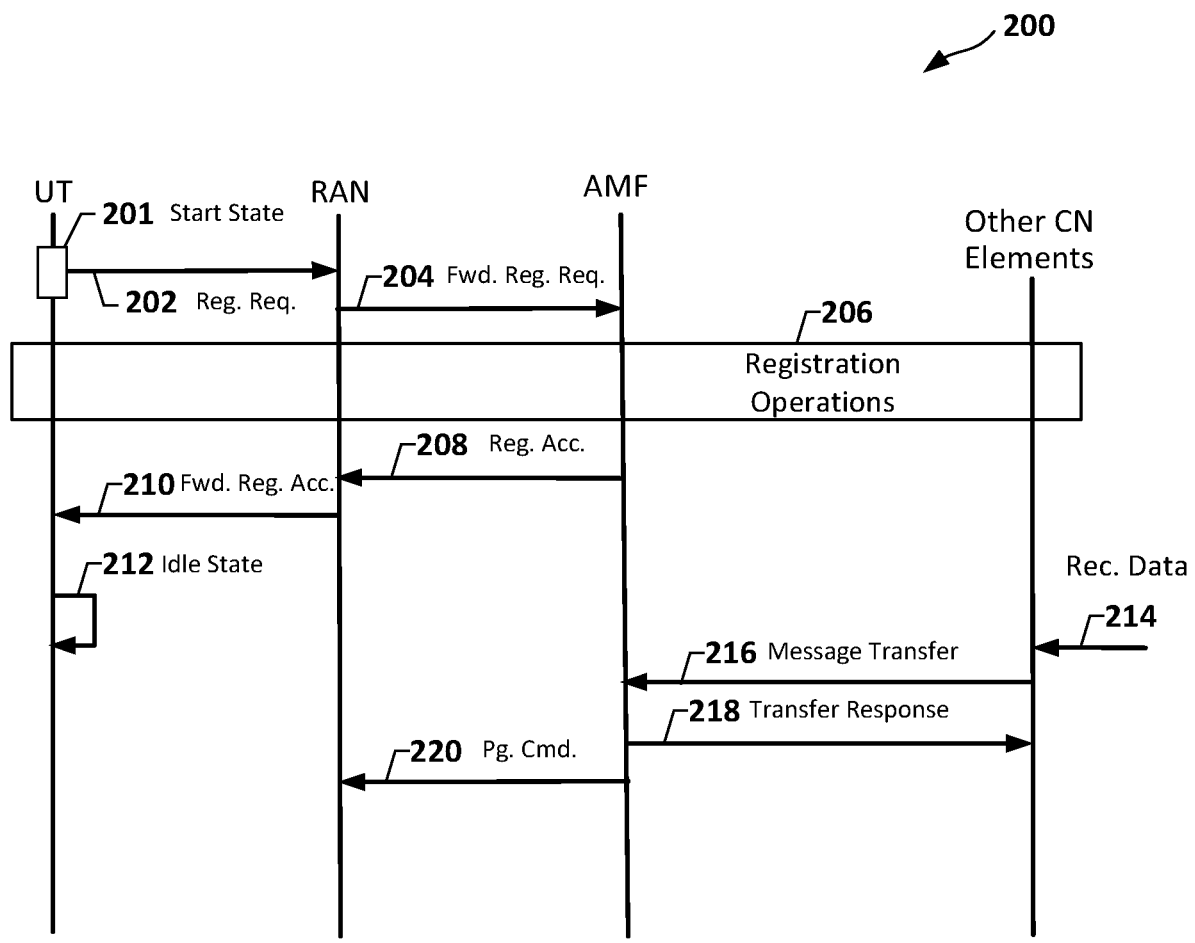
FIG. 2 is a flow diagram illustrating UT paging in a satellite-based 5G system.

FIG. 2 is a logic diagram of a flow 200 of operations in a process of the above-described UT registration and subsequent paging of a CM-IDLE state UT 124. Description of an example instance of the flow 200 will refer to UT 124-3. It will be understood that description using either UT-1 or UT-2 would be substantially identical. An instance of the flow 200 can proceed from a start state 201 to a sending by UT 124-3 of an initial registration request 202 to the AMF 106, e.g., over a reverse uplink resource (not explicitly visible in FIG. 1) of the service link 118, then from the GEO satellite 114 to the SRAN 102 over a reverse downlink resource of the feeder link 116. The SRAN 102, in response, can forward 204 the registration request to the AMF 106. The AMF 106 can respond by registration operations 206, followed by sending a registration accept 208. The registration operations 206 can be according to standard 5G techniques and, therefore, further detailed description is omitted. It will be assumed that the registration accept 208 assigns RA2 to UT 124-3. The SRAN 102, in response to the registration accept 208 can forward 210 the registration accept to UT 124-3. Upon UT 124-3 receipt of the forwarded registration accept 208, UT 124-3 can be registered in RA2. The UT 124-3 can thereafter move among RA2/TA4, RA2/TA5, RA2/TA6, and RA2/TA7 without having to re-register with the AMF 106.

At some time after the above-described registration process, UT 124-3 can switch 212 to the CM-IDLE state. The switch 212 to CM-IDLE can be in response to a UT inactivity condition, such as defined under 3GPP TS 23.501. It will be assumed that while UT 124-3 is in the CM-IDLE state, other core network elements receive, at 214, downlink data having UT 124-3 as the indicated destination. The CN elements, in response, can send an NamfN1N2MessageTransfer 216 to the AMF 106. The AMF 106 response to the NamfN1N2MessageTransfer 216 can include sending an NamfN1N2MessageTransferResponse 218 to the core network elements, and sending a page command 220 to SRAN 102. The page command is for the SRAN 102 to send a page to UT 124-3 to all 4 cells 120 covered by RA2, these being second cell 120-2, third cell 120-3, fourth cell 124-4, and fifth cell 120-5. This is due AMF 106 awareness of CM-IDLE UT 124-3 location being only that UT 124-3 is in RA2, the RA that UT 124-3 was assigned. The AMF 106 response 218 to the NamfN1N2MessageTransfer 216 therefore sends a page command 220 to the SRAN 102, and any other SRAN (not explicitly visible in FIG. 1) having jurisdiction over any of the four cells, 120-2, 120-3, 120-4, and 120-5 into which RA2 extends. This is a non-productive expenditure of system 100 resources.

Systems and methods in accordance with this disclosure can provide, without limitation, via features such as a TA-level tracking of UTs in CM-IDLE state, and corresponding TA-specific beam selection for UT paging, substantial reduction of duplicative expenditure of system resources.

In current 5GS techniques, a UT discovers that it has moved out of the current RA by listening to the System Information Blocks (SIBs) broadcast in the current radio cell. The SIBs transmitted by the SRAN contain the TA identifier of the current cell. If the TA identifier in the SIB is not in the UT's current registration TA list, the UT 124 initiates a re-registration process. Each re-registration process, with associated communications between the UT 124, the SRAN 102 and AMF 106, can incur satellite system bandwidth and overhead costs.

Features provided by disclosed systems and methods can also include a particular conditioning, at the UT, for transmitting location reports. Benefits of the particular conditioned transmission of UT location reports can include, without limitation, substantial reduction in UT transmission of location reports, and corresponding reduction in the reports' concomitant consumption of system resources.

In one implementation of conditioned transmission of UT location reports, in accordance with this disclosure, vertices of all TAs can be broadcast in System Information Blocks (SIBs) by an SRAN. A particularly configured UT can perform cell selection/reselection by first comparing its GPS position with the SIB broadcast information. For initial selection, the configured UT can send a registration request to the SRAN which, in response, can determine the TA based on cell identification, in combination with the identity of the beam from which the registration request was received. The SRAN can append the UT TA to the registration accept it sends to the AMF 106. The AMF 106, in response, will assign an RA (multiple TAs). The UT does not need to update its location if its location is within the assigned RA. When a paging signal arrives from the AMF 106, the SRAN determines, for example from a mapping it can establish, the UTs current TA and sends the paging signal only to the correct beam to reach the UT.

In an aspect, implementation of conditioned transmission of UT location reports can include particularly configured UTs that can include an adaptive distance threshold logic. Features of the adaptive distance threshold logic can include adaptive setting of the distance threshold based, for example, on the UT's distance from the border of the advertised cell vertices. Benefits of this feature include, but are not limited to, reduction in UT need to initiate cell reselection.

Figure 3:
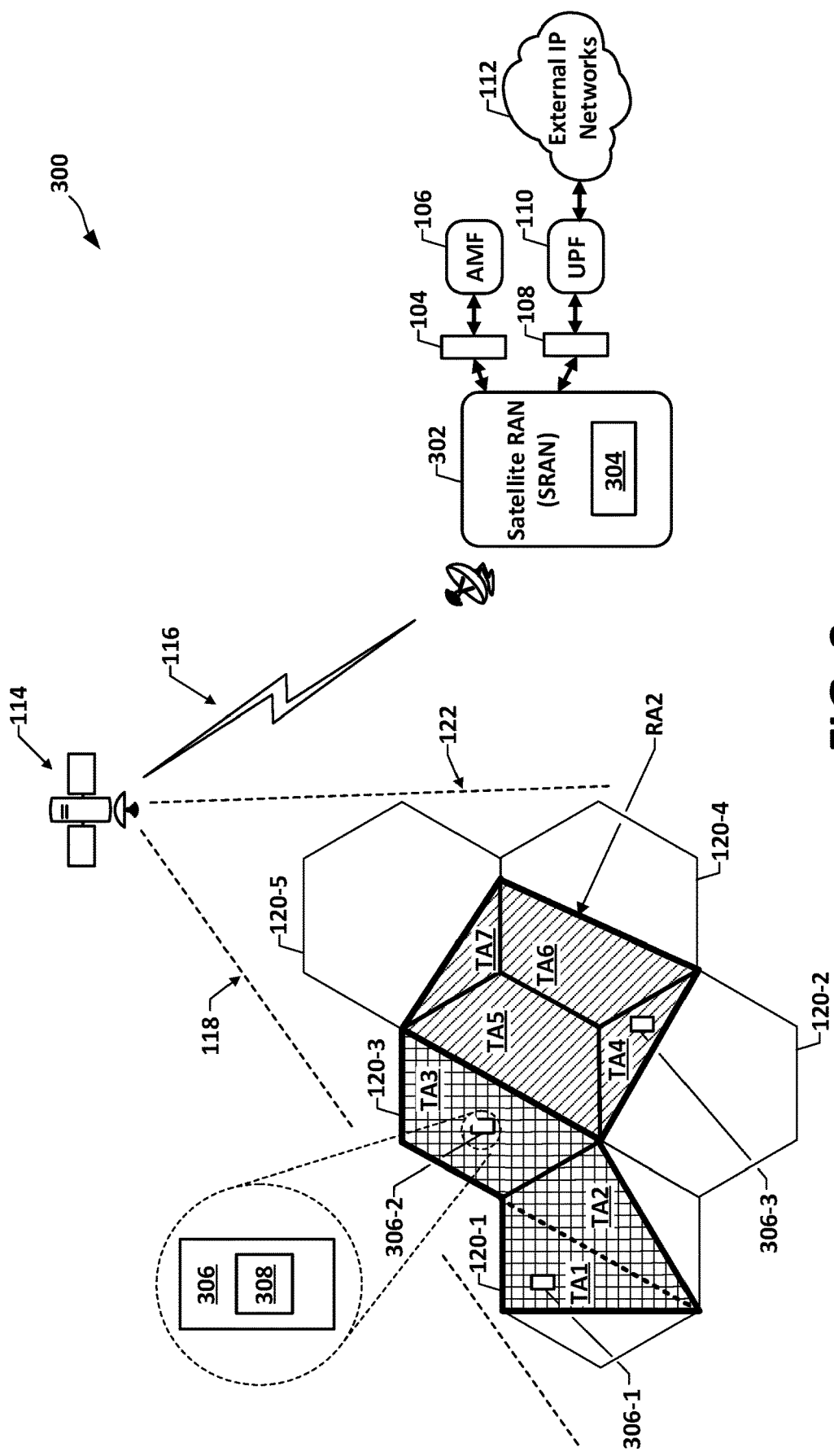
FIG. 3 is a block schematic of an implementation of one example satellite-based 5G system for resource conserving UT TA-level location tracking, and beam selective UT paging, in accordance with this disclosure.

FIG. 3 is a block schematic of one example implementation of a satellite-based 5G high efficiency paging, tracking, and communication system 300 (hereinafter "system 300") in accordance with this disclosure. To avoid obfuscation with detailed description of a new cell and RA configuration, various features and operations of system 300 will be described using the FIG. 1B configuration of cells 120, and example configuration of RA1 and RA2.

Features provided by the system 300 can include, as described in greater detail in paragraphs that follow, resource conserving, reduced overhead/power paging of 5G UTs. Features provided by the system 300 can also include reduced overhead location reporting by 5G user terminals, and reduced re-registration.

The system 300 can include a selective beam paging SRAN 302, which can be communicatively connected via the first interface 104 to the AMF 106, and communicatively connected via the second interface 108 to the 5G UPF 110 to access external IP networks 112. In one or more implementations, certain functionalities of the FIG. 1 SRAN 102 can be carried into the selective beam paging SRAN 302. Further detailed description of such functionalities will be omitted except where incidental to description of features or operations particular to the selective paging SRAN 302. To reduce repetition of "selective beam paging" in the context of "selective beam paging SRAN 302," subsequent description will alternatively recite "selective beam paging SRAN 302" as "SB paging SRAN 302."

To avoid obscuring concepts with description of protocol not necessarily specific to practices according to this disclosure, description of example operations of the system 300 will assume UT registration requests are configured to conform to or to be compatible with 3GPP TS 23.502. This is only for purposes of example and is not intended as a limitation on practices in accordance with this disclosure or its appended claims.

An implementation of the SB paging SRAN 302 can include a TA/location determination logic 304. Functionality of the TA/location determination logic 304 can include determining the current TA in which the UT 306-1, UT 306-2, and UT 306-3 (collectively "UT 306" or "UTs 306") are located. As described in greater detail later, the TA/location determination logic 304 can be configured to determine the UT 306 current TA from a location report from the UT 306 that indicates the UT 306's geolocation. The SB paging SRAN 302 can be configured to include the UT 306's current TA in the forwarding to the AMF 106 of the registration request. In an implementation, the UTs 306 can also include a UT location detection/reporting logic 308. Functionalities of the UT location detection/reporting logic 308 can include detection of the UT 306's current location and sending location reports as identified above. The UT location detection/reporting logic 308 can also be configured to determine the UT 306's current TA and to include that TA in its location reports and in its initial and subsequent registration requests to the SB SRAN 302.

Functionalities of the UT location detection/reporting logic 308 can include adaptive distance threshold logic, in which the distance threshold the UT 306 must move to initiate a location report can be adaptively set. In an aspect, the adaptive setting can be based, at least in part, on the UT's distance from the border of the cell vertices advertised via the cell vertices advertised by system information broadcast (SIB). For purposes of description, UTs 306 with the UT location detection/reporting logic 308 will be alternatively referred to as "resource conserving UTs" UTs 306. To reduce repetition of "resource conserving" in the context of "resource conserving UT 306," subsequent description will alternatively recite "RSC UT 306."

In an implementation, the RSC UTs 306 can be configured to send to the SB paging SRAN 302 a location report prior to initial registration. The SB paging SRAN 302 can be configured to respond by determining the current TA of the UT 306, e.g., using the TA determination logic 304, based on the location report together with the identity of the cell in which the location report was received. The SB paging SRAN 302 can be configured to send the determined TA to the RSC UT 306. The RSC UT 306 can subsequently, when it sends its initial registration request, include the TA it received earlier from the SB paging SRAN 302.

The SB paging SRAN 302 can be configured to respond to receipt of a registration request by forwarding the request to the AMF 106, together with the UT 306's current TA that the SB paging SRAN 302 determined from, or extracted from the request. The SB paging SRAN 302 can subsequently receive from the AMF 106 a registration accept that can define an RA for the UT 306. The SB paging SRAN 302 can be configured to forward the registration accept content, including the newly assigned RA, to the UT.

Upon completion of the UT 306 registration process, the UT 306 can be in a CM-CONNECTED/RRC-Active state in which the UT can receive data from the AMF 106, via transmission from the SB paging SRAN 302. At some time subsequent to the above-described registration process, the UT 306 can switch from RRC Active to CM-IDLE state, for example, in response to detecting inactivity. Subsequent to the RSC UT 306 switching to a CM-IDLE state, the UT SB paging SRAN 302 can receive from the AMF 106 a page command for the RSC UT 306. The SB paging SRAN 302 can be configured to respond to the page command by determining a satellite beam, e.g., selected among FIG. 3 satellite beams 120, for paging the RSC UT 306. The SB paging SRAN 302 can be configured to perform the selection by a look-up or other process for determining the subject RSC UT 306's current TA, followed by look-up or reference to a TA-to-satellite beam table or record. The SB paging SRAN 302 can be configured to then page the RSC UT 306 on the determined satellite beam.

Technical benefits provided by the above-described SB paging SRAN 302, logic 304 and operations of the UTs 306 with location reporting logic 308 can include, without limitation, beam-selective, resource conserving, lowered cost paging and activation of registered CM-IDLE state UTs to receive transmission of UT-destined packets.

Figure 4:
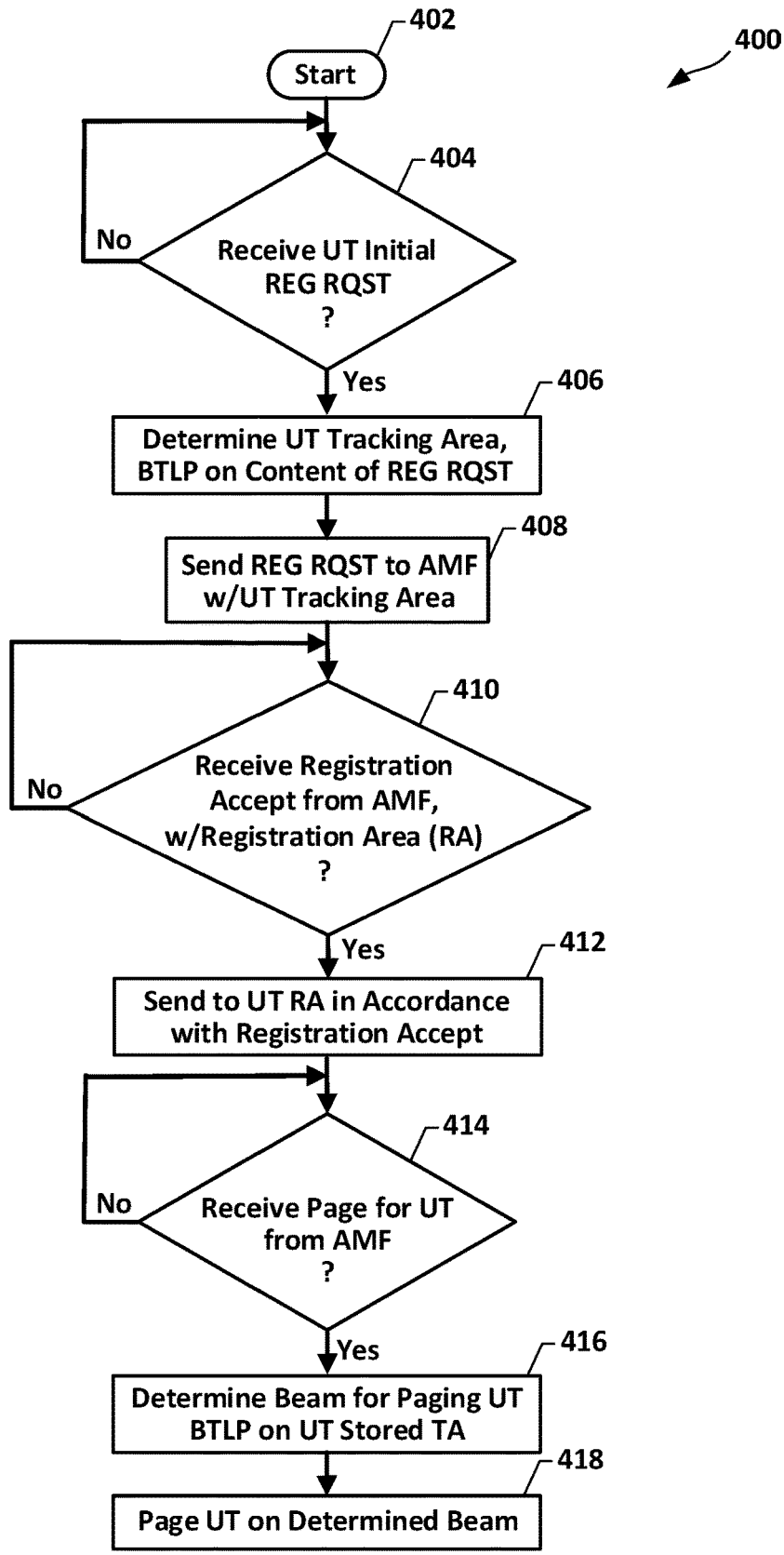
FIG. 4 is a flow diagram of example operations in a process for resource conserving UT registration, TA-level location tracking, and beam selective UT paging for systems and methods in accordance with this disclosure.

FIG. 4 is a flow diagram of operations in processes 400 in satellite based UT 5G registration, tracking, paging, and packet transmission in implementations of systems and methods in accordance with this disclosure. For convenience, example instances of the flow 400 will be described in reference to the system 300. Instances will assume, as a start state, a RSC UT 306 that is within one of the cells 120 and has not yet registered with the AMF 106. In describing example operations that relate to or reference a particular one of the RSC UTs 306, for example, a RSC UT 306 from which a registration request is received, the UT 306 will be referred to as "the subject RSC UT 306." For convenience, the registration request will be alternatively referenced as "REG RQST," in accordance with the FIG. 4 labeling.

Operations in the flow 400 can proceed from a start state 402 to 404 upon the SB paging SRAN 302 receiving from a subject RSC UT 306 a REG RAST. The flow 400 can proceed from 404 to 406, where the SB paging SRAN 302 operations can determine the subject UT 306's current TA. The operations at 406 can be configured to determine the current TA based, at least in part, on a content of the REG RAST. Referring to FIG. 4, the labeling visible on block 406 abbreviates "based at least in part" as "BTLP." In one example implementation RSC UT 306 operations at 406 can include in the REG RAST an identity of the RSC UT 306's current cell. In such implementation, the system 300 can provide the SB paging SRAN 302 (appearing in FIG. 4 as "SB SRAN") an identity of the particular spot beam on which the REG RAST was received. In another implementation of operations at 406, the RSC UTs 306 can send an encrypted location report to the SB paging SRAN 302, prior to sending an initial REG RAST to the AMF 106. The location report can include the subject RSC UT 306's geolocation. The SB paging SRAN 302 can be configured to respond to the location report by determining the RSC UT 306's TA, e.g., by use of a geolocation-to-TA database (not explicitly visible in FIG. 4), and then including the determined TA, in an encrypted location report response the SB paging SRAN 302 sends to the RSC UT 306. Further to this implementation, the RSC UT 306 can be configured to include the received TA in the REG RAST it sends for reception at 404 by the SB paging SRAN 302.

After the SB paging SRAN 302 determines the subject RSC UT 306's current TA at 406, the flow 400 can proceed to 408 where the SB paging SRAN 302 can send the REG RAST, with the determined TA appended or included, to the AMF 106. After the sending at 408, the SB paging SRAN 302 can, as represented by block 410, wait for receipt of a registration accept from the AMF 106. Description will assume, only for purposes of example, that registration accept is in accordance or compatible with 3GPP TS 23.502.

It will be understood that "wait," in the context of block 410 functionality, does not necessarily require the SB paging SRAN 302 terminate operations until receipt of the registration accept. For example, during the wait at block 410 the SB paging SRAN 302 may perform various other operations, communications, and processes (not visible in FIG. 4). These can include, for example, other instances of the flow 400 for other UTs. Upon receipt of the registration accept from the AMF 106, the flow 400 can proceed to 412 and send the registration accept to the RSC UT 306. The RSC UT 306 may respond to receipt of the registration accept forwarded at 412 by transmitting a registration complete (not visible in FIG. 4) to the SB paging SRAN 302.

Subsequent to the registration associated in response to 412, the subject RSC UT 306 can switch, e.g., in association with inactivity, to the 5G CM-IDLE state. The trigger for switching to the CM-IDLE state, and the switching operations, are not necessarily specific to practices according to this disclosure and can be performed, for example, using standard 5G techniques.

When the subject registered RSC UT 306 is in the CM-IDLE state, core network elements of the system 300 can receive at 414 downlink data addressed to the RSC UT 306. The AMF 106, in response, can send a page command to the SB paging SRAN 302. In an aspect, the page command can include an S-TMSI (Temporary Mobile Subscriber Identity) assigned to the RSC UT 306 and an identifier of the most recent RA assigned to the UT 306. The SB paging SRAN 302, upon receiving the page command for the subject UT 306, can proceed from 414 to 416, and can apply a process according to this disclosure for determining a best beam, among the plurality of beams 120, for sending a page to the registered RSC UT 306.

Figure 5:
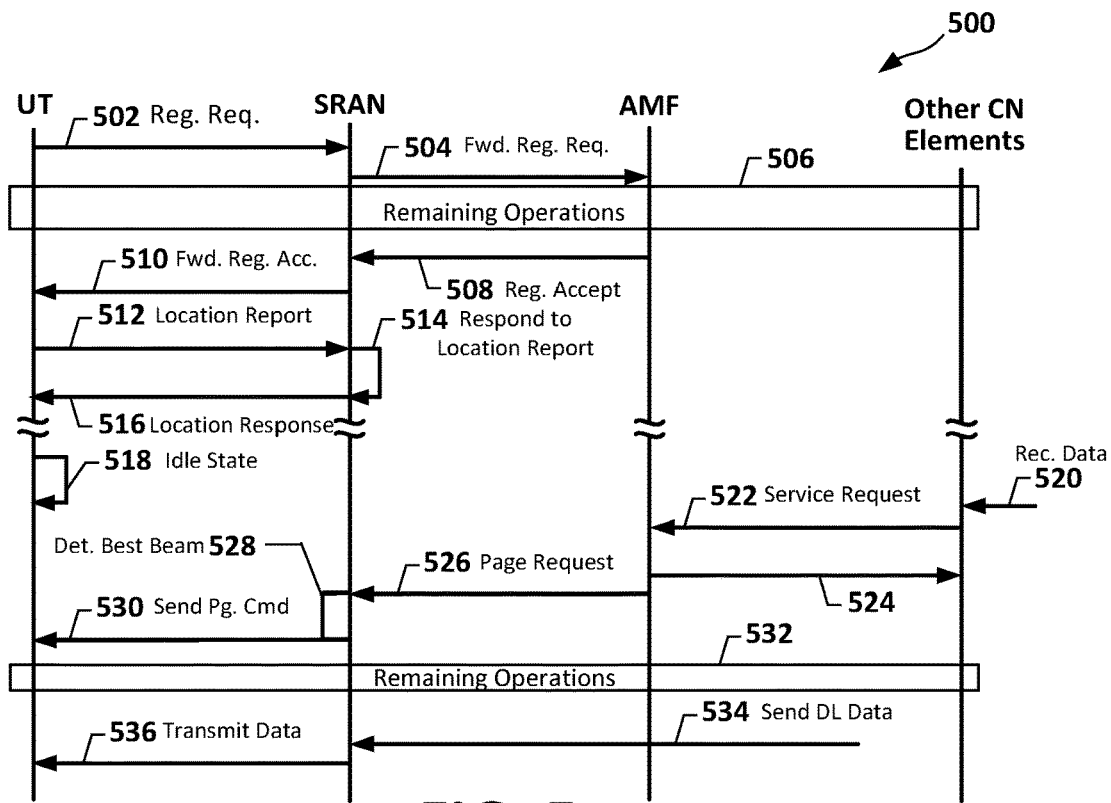
FIG. 5 is a sequence diagram illustrating operations in a process for resource conserving UT registration, TA-level location tracking, and beam selective UT paging for systems and methods in accordance with this disclosure.

FIG. 5 is a sequence diagram illustrating a flow 500 of operations in UT registration, tracking, paging, and data delivery, in satellite-based 5G systems and methods in accordance with this disclosure. Example operations of the flow 500 will be described in reference to FIGS. 3 and 4. An instance of the 500 can begin with any RSC UT 306, e.g., RSC UT 306-1, sending at 502 an initial REG RAST 502 to the SB paging SRAN 302. The SB paging SRAN 302, in response, can determine the present TA of the subject RSC UT 306, based on UT current TA indicative information included in, or associated with the SB paging SRAN 302's reception of the REG RAST 502, or both. In one or more implementations, the RSC UTs 306 can be configured to include, as the RSC UT's TA indicative information in the REG RAST 502, a UT current cell identifier. In an implementation, the SB paging SRAN 302 can be provided with information identifying the specific satellite beam or cell 120 in which the REG RAST 502 was received. The SB paging SRAN 302 can include logic, e.g., SB paging SRAN 302 logic 304, configured for resolving the RSC UT 306's current TA from the UT current cell identifier and the above-described beam identification. In another implementation, described in greater detail in subsequent paragraphs, the UT TA indicative information carried in the REG RAST 502 can include a TA identifier inserted by the subject RSC UT 306.

The SB paging SRAN 302, upon receiving the REG RAST 502, can send to the AMF 106 a forwarded REG RAST 504, which can include the determined current TA of the RSC UT 306. Upon AMF 106 receiving the forwarded REG RAST 504, the flow 500 can perform at 506 remaining operations in the UT registration procedure. Operations at 506 can be in accordance with known 5G UT registration techniques and can include the AMF 106 determining an RA for the subject RSC UT 306, and the AMF 106 including the RA in a registration accept 508 the AMF 106 can send back to the SB paging SRAN 302. The registration accept 508 can include the S-TMSI of the requesting RSC UT 306. AMF 106 assignment of the S-TMSI can be, for example, according to known 5G AMF S-TMSI assignment techniques. The SB paging SRAN 302, in response to the registration accept 508, can at 510 forward the registration accept 508, with its included AMF-assigned RA and AMF-assigned TMSI, to the subject RSC UT 306. The RSC UT 306 can, but does not necessarily, respond to the forwarded registration accept 508 by transmitting a registration complete (not visible in FIG. 5) to the SB paging SRAN 302.

Upon receipt of the forwarded registration accept 508 the subject RSC UT 306 can switch to the 5G CM-CONNECTED state. If the core network elements deliver data, the data can be immediately delivered to the 5G CM-CONNECTED RSC UT 306, without paging. Operations associated with the delivery can include packets being sent by the UPF 110, which can be handling the user plane, to SB paging SRAN 302, and the AMF 106 handling the control plane. Since the RSC UT 306 is in the CM-CONNECTED state, the AMF 106 can notify the UPF 110 to proceed to send the data to the RSC UT 306 via the SB paging SRAN 302.

While in the CM-CONNECTED state, the registered subject RSC UT 306 can send one or more location reports to the SB paging SRAN 302. Such location reports can include the registered RSC UT 306's S-TMSI. FIG. 5 shows, as an example, a location report 512 from the registered RSC UT 306 to the SB paging SRAN 302. The location report 512 can indicate the registered RSC UT 306's current cell and assigned S-TMSI.

In an aspect, the SB paging SRAN 302 can be configured to not forward the location report 512 to the AMF 106, and configured to instead notify the AMF 106 of UT movement only by forwarding registered subject RSC UT 306 requests for mobility registration updating, as described in greater detail in later paragraphs. The SB paging SRAN 302 can be further configured to respond to the location report 512 by applying, at 514, operations for determining the registered subject RSC UT 306's current TA. Operations at 514 can be configured to determine the TA based on or utilizing, for example, the registered RSC UT 306's S-TMSI and indication of current cell carried by the location report 512. The SB paging SRAN 302 can also be configured to send to the registered subject RSC UT 306 a location response 516 that includes the UT's current TA determined at 514. It will be understood that the meaning of "update" and variants thereof, as used herein in contexts such as but not limited to operations 514, can include a first instance and can include instances wherein a selective adjustment maintains an adjustment object or target at a current state or value.

Referring to FIG. 5, flow 500 operations subsequent to the above-described registration can include the registered subject RSC UT 306 switching at 518 from the CM-CONNECTED state to the CM-IDLE state, for example, due to inactivity of the RSC UT 306. Subsequent to the registered subject RSC UT 306 switching at 518 to CM-IDLE state, core network elements of the system 300 can receive at 520 downlink data addressed to the registered RSC UT 306. The core network elements can respond, for example, by sending to the AMF 106 a Namf_Comm_N1N2MessageTransfer service request 522.

The Namf_Comm_N1N2MessageTransfer service request 522 can be defined, for example, in accordance with 3GPP TS 23.502. The AMF 106, in response, can send to the core network elements a Namf_Comm_N1N2MessageTransfer Response 524, followed by sending a page request 526 to the SB paging SRAN 302. The page request 526 can include the RA and can carry the S-TMSI the AMF 106 assigned to the registered subject RSC UT 306. The SB paging SRAN 302 can be configured to respond to the page request 526 by applying at 528 operations for determining a best beam, among the plurality of FIG. 3 beams 120, for sending a page to the registered subject RSC UT 306. In an aspect, determination at 528 can be based on reference to a TA-to-beam mapping using the registered subject RSC UT 306's S-TMSI included in the page request 526.

After determining at 528 the best beam for paging the registered subject RSC UT 306 the flow 500 can proceed to 530, where the SB paging SRAN 302 can send a paging command to the GEO satellite 114, specifying the determined best beam. After the sending at 530, the flow 500 can proceed to 532, where remaining 5G UT CM-IDLE to CM-CONNECTED registration operations can be performed. The flow 500 can then proceed from 532 to 534, where the core network elements can send the downlink data received at 520 to the SB paging SRAN 302 and can then proceed to 536, where the SB paging SRAN 302 can transmit the data to the now RRC-ACTIVE state subject RSC UT 306.

It will be understood that FIG. 5 showing one instead of, for example, a plurality of instances of the location report 512, is for convenience of description, and is not intended as a limitation of practices in accordance with this disclosure.

Figure 6:
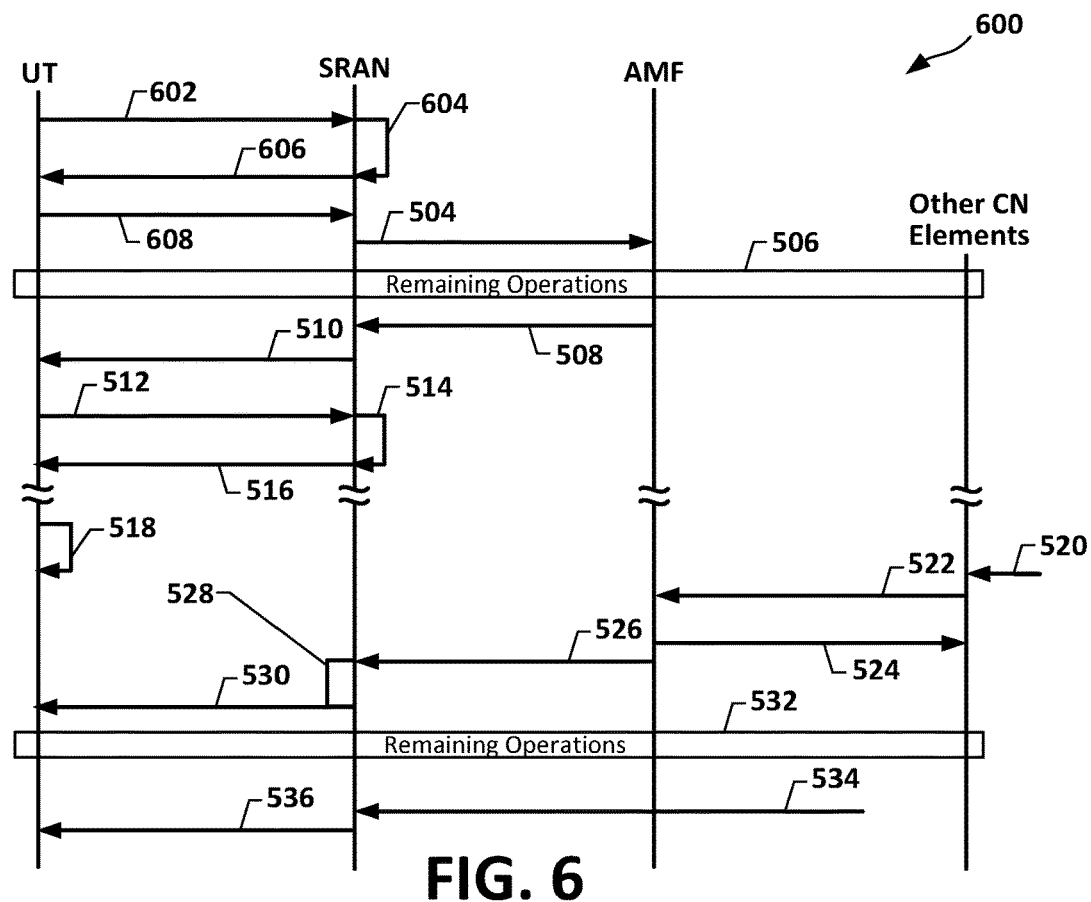
FIG. 6 is a sequence diagram illustrating alternative UT initial registration portions, in a process for resource conserving UT registration, TA-level location tracking, and beam selective paging for satellite-based 5G systems and methods in accordance with this disclosure.

FIG. 6 is a sequence diagram illustrating an example sequence 600 that can include portions of the above-described sequence 500, with alternative UT initial registration portions, for UT registration tracking, paging, and data delivery in satellite-based 5G systems and methods in accordance with this disclosure. The FIG. 6 example sequence 600 includes portions of the flow 500 initial registration sequence, e.g., operations 504-510, and location update operations at 512-516, as well as switching to CM-IDLE at 518. The FIG. 6 example sequence 600 also includes data arrival, paging and data delivery operations 520-536. This is for convenience in description, e.g., to avoid redundancy or obfuscation with added examples of features or blocks already described in the context of FIG. 5 and is not intended as a limitation on the scope of practices in accordance with the flow 600.

Features of the sequence 600 can include the RSC UT 306 sending a location report 602 to the SB paging SRAN 302, prior to the RSC UT 306 sending an initial REG RAST, e.g., the flow 500 sending of the initial REG RAST 502. The RSC UT 306 can also be configured to determine, prior to operations at 602, the RSC UT 306's geolocation and to include in the geolocation in the location report 602. The SB paging SRAN 302 can be configured to respond to the location report 602 by proceeding to 604 where the logic 304 of the SB paging SRAN 302 can use the RSC UT 306's geolocation to look up or otherwise access a geolocation-to-TA database (not explicitly visible in FIG. 6). SB paging SRAN 302 operations 604 can include inserting the determined TA into a location report response 606, sand ending such response to the RSC UT 306.

In an implementation, the RSC UT 306 can be configured to store the TA included in the location report response received at 606. The RSC UT 306 can be further configured such that, when it generates and sends a REG RAST such as 608, the stored TA is included in that REG RAST. This differs from the REG RAST 502 sent by the RSC UT 306 in the FIG. 5 sequence 500. Operations by the SB paging SRAN 302 in response to receiving the REG RAST 608 can therefore differ from operations the SB paging SRAN 302 applied upon receiving the FIG. 5 flow 500 REG RAST 502. As an example, in the sequence 600, SB paging SRAN 302 operations can simply extract the TA from the REG RAST 608 and append it to the forwarded REG RAST 504. In one or more implementations the SB paging SRAN 302 can be configured to store the TA received in the REG RAST 608. In other implementations, one example of which will be described in greater later in this disclosure, the SB paging SRAN 302 can be configured to discard or otherwise not maintain a stored TA for the RSC UT 306.

Figure 7:
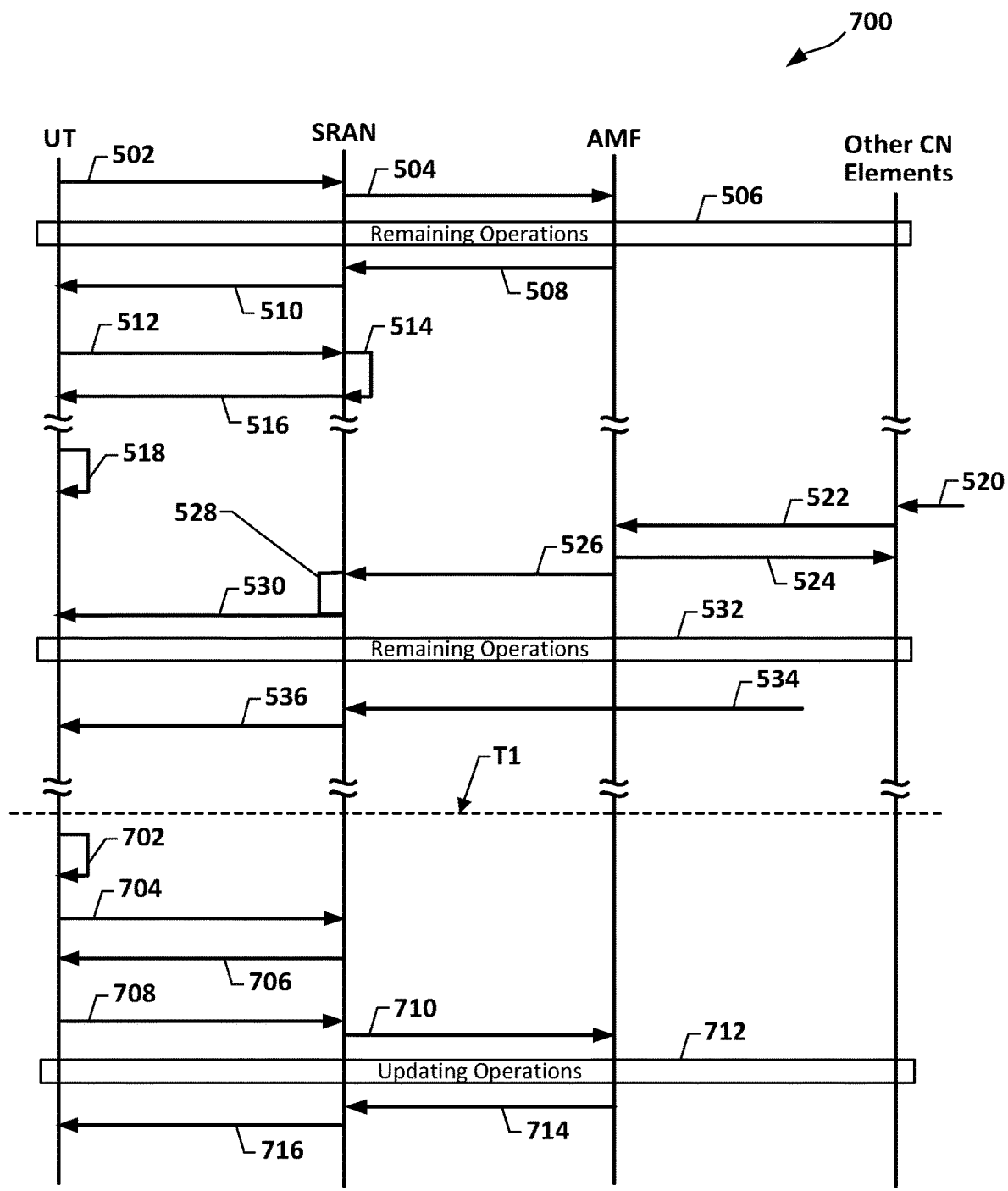
FIG. 7 is a sequence diagram illustrating operations in UT registration, TA-level tracking, and beam selective paging, for satellite-based 5G systems and methods in accordance with this disclosure.

FIG. 7 is a flow diagram illustrating a sequence 700 of operations in UT registration, tracking, paging, and data delivery, with features of movement-based mobility registration updating, for satellite-based 5G systems and methods for satellite resource conserving 5G UT paging. The FIG. 7 example sequence 700 can be implemented, and will be described accordingly, as an extension of the above-described FIG. 5 sequence 500. Description of an instance of the sequence 700 will assume that operations 502-536 have been performed, and that prior to time "T1" the subject UT has switched back to the CM-IDLE state. It will also be assumed that at 702 the subject RSC UT 306 has determined that its movement exceeded a threshold distance and, in response, the RSC UT 306 sends the SB paging SRAN 302 a location report 704. The location report 704 can include the S-TMSI assigned to the subject RSC UT 306, and can include an updated UT location data. The SB paging SRAN 302 can, in response, determine the subject RSC UT 306's current TA based, for example, on the updated UT location data, and the send the subject RSC UT 306 a location response 706, which includes the newly determined TA. The subject RSC UT 306 can, upon receiving the newly determined TA, check to see if that TA is in its currently assigned RA. If the answer is affirmative the flow 700 can return to 702 and continue until, for example, a next instance of above-threshold movement by the subject RSC UT 306.

Assuming the subject RSC UT 306 finds the newly determined TA is not in its currently assigned RA, the RSC UT 306 can send a REG RAST 708 to the SB paging SRAN 302. The REG RAST 708 can be configured, for example, as a mobility registration updating under 3GPP TS 23.502, version 15.2.0, Release 15. The SB paging SRAN 302, in response to REG RAST 708, can perform a forwarding 710 of the REG RAST 708, with the newly determined TA, to the AMF 106. The AMF 106, upon receiving the forwarding 710 of the REG RAST 708, with the newly determined TA, can initiate additional mobility registration updating operations 712. The AMF 106 can then proceed from 712 to 714, where operations can include sending a mobility registration update accept 714 back to the SB paging SRAN 302 for delivery to the RSC UT 306. The SB paging SRAN 302, in response, can perform a forwarding 716 of the mobility registration update accept 714.

Figure 8:
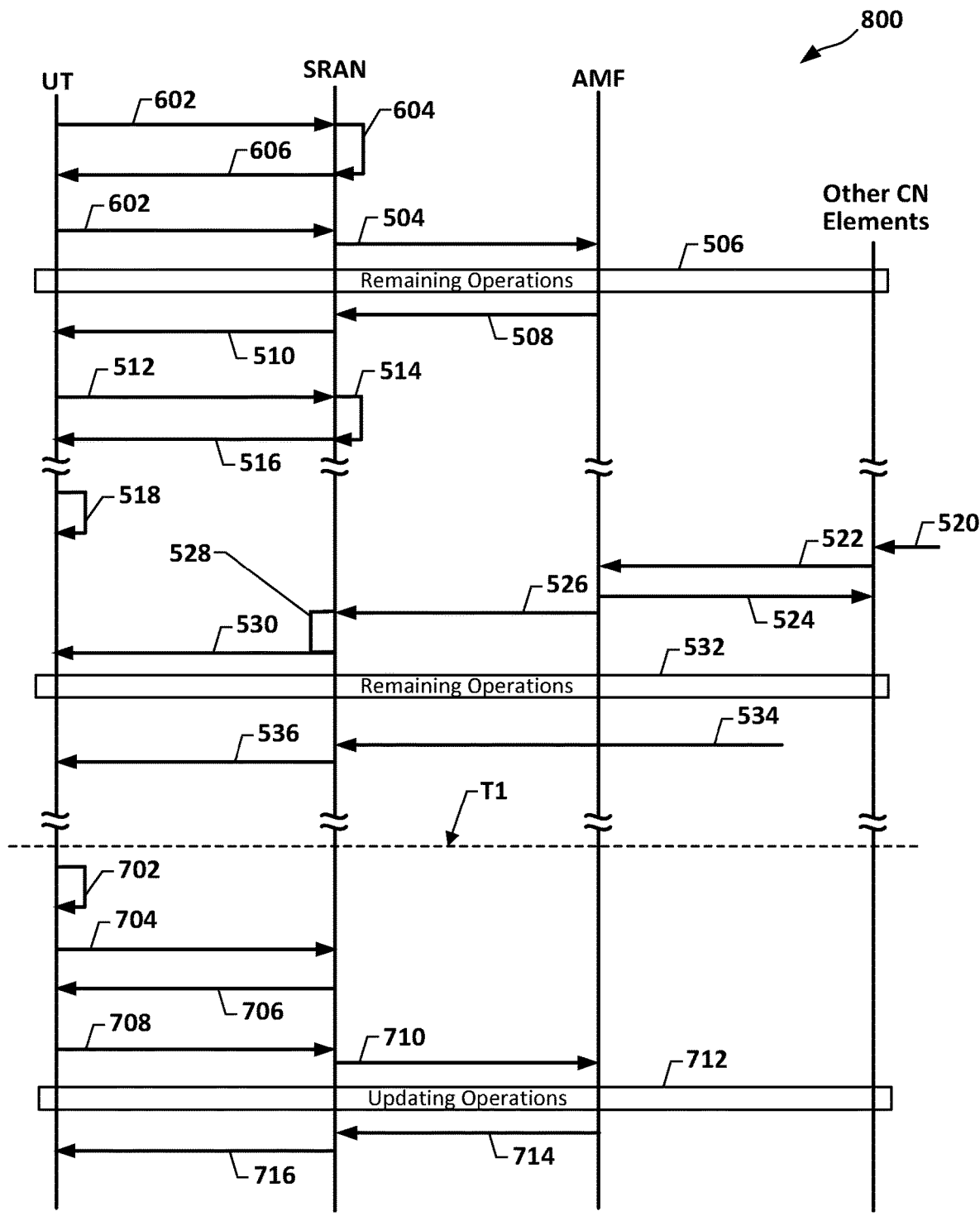
FIG. 8 is a sequence diagram illustrating operations of an alternative UT initial registration, in a process for resource conserving UT registration, TA-level location tracking, and beam selective paging, for satellite-based 5G systems and methods in accordance with this disclosure.

FIG. 8 is a flow diagram illustrating a flow 800 of operations in alternative UT initial registration portions, for operations in UT registration tracking, resource conserving paging, and data delivery for satellite-based 5G systems and methods in accordance with this disclosure. The FIG. 8 example flow 800 can be implemented and will be described as an extension of the above-described FIG. 6 flow 600. Operations 702-716 of the flow 800 can be identical to such operations in the context of the 700. Therefore, FIG. 8 is self-descriptive and additional description is not necessary.

When there is downlink data for a subject RSC UT 306 in CM-IDLE state, the AMF 106 can send to the SB paging SRAN 302 a Paging signal. The Paging signal can include the S-TMSI and the current RA of the subject UT 306 RA. Based on an SB paging SRAN 302 stored mapping of TA to satellite beam, the SB paging SRAN 302 can send the paging signal to a beam that covers the subject RSC UT 306's current TA. This can provide substantial savings of satellite system resources, i.e., bandwidth and power, compared to the conventional satellite 5G paging of the entire registration area of the RSC UT 306.

For a UT in CM-CONNECTED/RRC-INACTIVE state, the paging can be originated by the SB paging SRAN 302, instead of the SRAN receiving and forwarding a paging from the AMF 106. A reason is that, from the AMF 106 vantage point, a subject RSC UT 302 in the CM-CONNECTED/RRC-INACTIVE state appears to be in the CM-CONNECTED state, and AMF 106 sending data to a CM-CONNECTED UT does not require a preceding page of the UT. Referring to FIG. 3, specific operations can include the AMF 106 handling the control plane and the UPF 110 handling the user plane, and when data for a subject RSC 306 arrives at the UPF 110 the UPF notifies the AMF 106 about the data. Since the UT in the CM-CONNECTED/RRC-INACTIVE state appears to be in the CM-CONNECTED state, the AMF 106 response includes notifying the UPF 110 to proceed with sending the data to the subject RSC UT 306 via the SB paging SRAN 302. This distinguishes from AMF 106-UPF 110 communication and operations when data for a subject RSC 306 arrives at the UPF 110 while the subject RSC UT is in the CM-IDLE state. Such communication and operation includes the AMF 106 notifying the UPF 110 to hold the data while the AMF 106 is paging the subject RSC UT 306.

Figure 9:
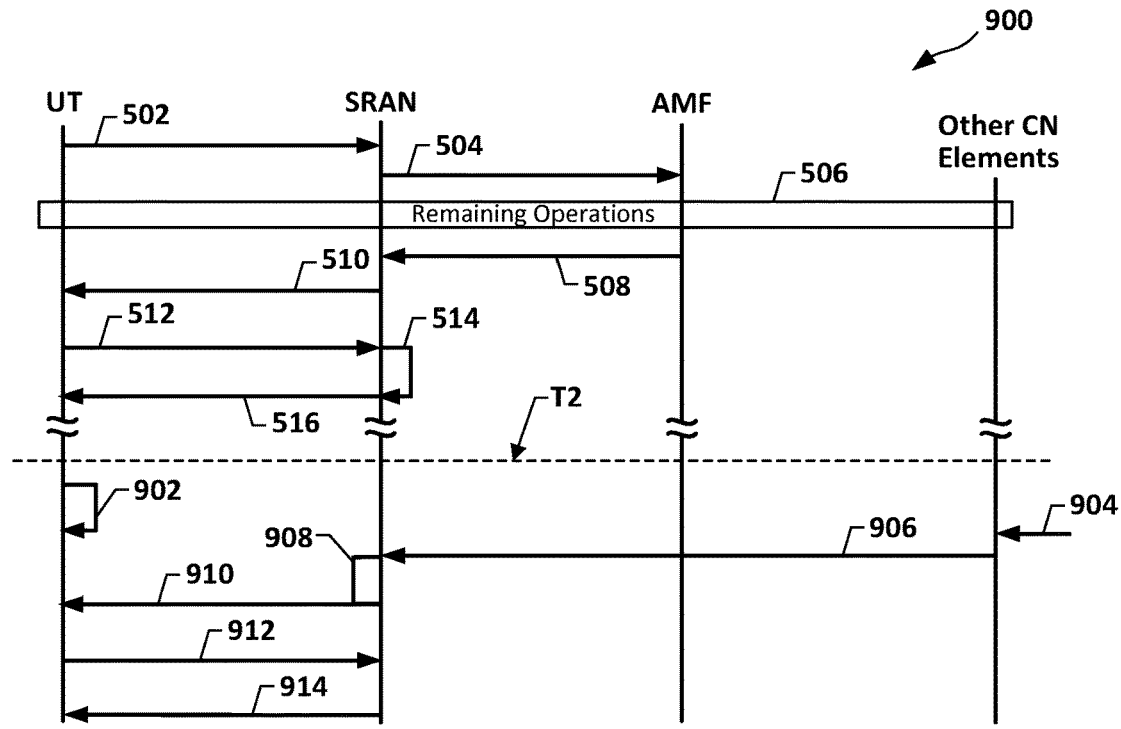
FIG. 9 is a sequence diagram of operations associated with UT registration, including switching to RRC-INACTIVE state, and direct to SRAN paging, in a process for resource conserving UT registration, TA-level location tracking, and beam selective paging, for satellite-based 5G systems and methods in accordance with this disclosure.

FIG. 9 is a sequence diagram 900 of operations of UT registration, followed by switching to RRC-INACTIVE State, and proceeding to direct-to-SRAN paging, for satellite-based 5G systems and methods for satellite resource conserving 5G UT paging in accordance with this disclosure.

The FIG. 9 example sequence 900 can be implemented and will be described as an extension of the above-described FIG. 5 flow 500. In an instance of the sequence 900, operations 502-516 will be assumed to have been performed, and that at "T2" the subject RSC UT 306 is in the CM-CONNECTED state. It will be assumed that at 902 the subject UT 306 switches to the RRC-INACTIVE state, for example, based on an inactivity and that, at 904, other CN elements have data for delivery to the subject RSC UT 306. The sequence 900 can then proceed to 906 to transfer the data to the subject RSC UT 306. Operations at 906 are in accordance with the subject RSC UT 306 in the RRC-INACTIVE state being seen as CM-CONNECTED by the AMF 106. Accordingly, with the AMF 106 handling the control plane and the UPF 110 handling the user plane, the AMF 106 notifies the UPF 110 to proceed with sending the data to the subject RSC UT 306 via the SB paging SRAN 302. The SB paging SRAN 302, in response, can determine at 908 the best beam for paging the subject RSC UT 306. The determination at 908 can be identical to the above-described determination at 528 of sequences 500, 600, 700, and 800. The SB paging SRAN 302, after the determination at 908, can send a page command 910 to the GEO satellite 114. Assuming the page signal reaches the RSC UT 306, the RSC 306 UT can send a page response 912, whereupon the SB paging SRAN 302 can send downlink data 914.

Figure 10:
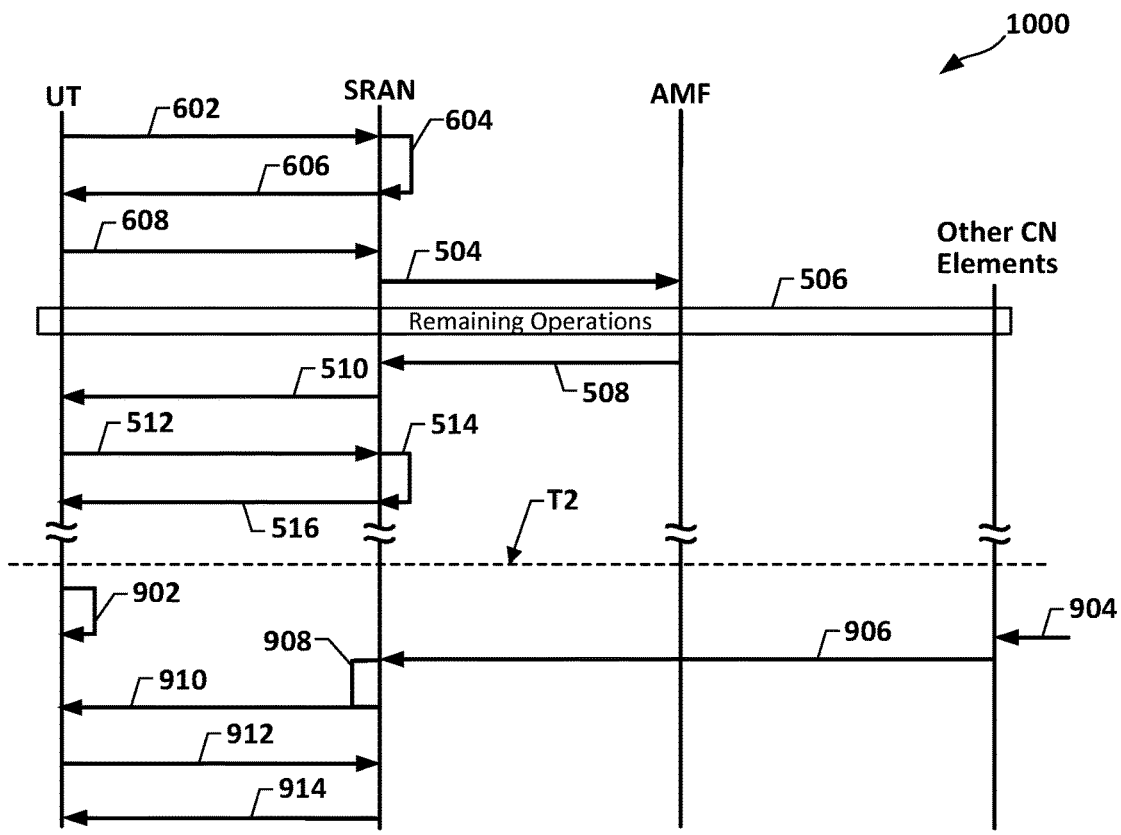
FIG. 10 is sequence diagram illustrating alternative UT initial registration portions, for operations in a process for UT registration, TA-level location tracking, switching to RRC-INACTIVE State, and direct to SRAN paging, for satellite-based 5G systems and methods in accordance with this disclosure.

FIG. 10 is a sequence diagram illustrating alternative UT initial registration portions, in a sequence 1000 of operations in UT registration, switch to RRC-INACTIVE State, and direct to SRAN paging, for satellite-based 5G systems and methods for satellite resource conserving 5G paging. The FIG. 10 example sequence 1000 can be implemented and will be described as an extension of the above-described FIG. 6 sequence 600. Operations 902-914 of the sequence 1000 can be identical such operations in the context of the sequence 900. Therefore, FIG. 10 is self-descriptive and additional description is not necessary.

In the above-described flow 400, and sequences 500, 600, 700, 800, 900, and 1000, the SB SRAN 302 maintained a record of the subject RSC UT 306 current TA. In another implementation, a record of each RSC UT 306 current TA can be maintained by a modification of the AMF 106, which for purposes of convenience can be referred to as a "TA-Level UT Paging AMF."

Figure 11:
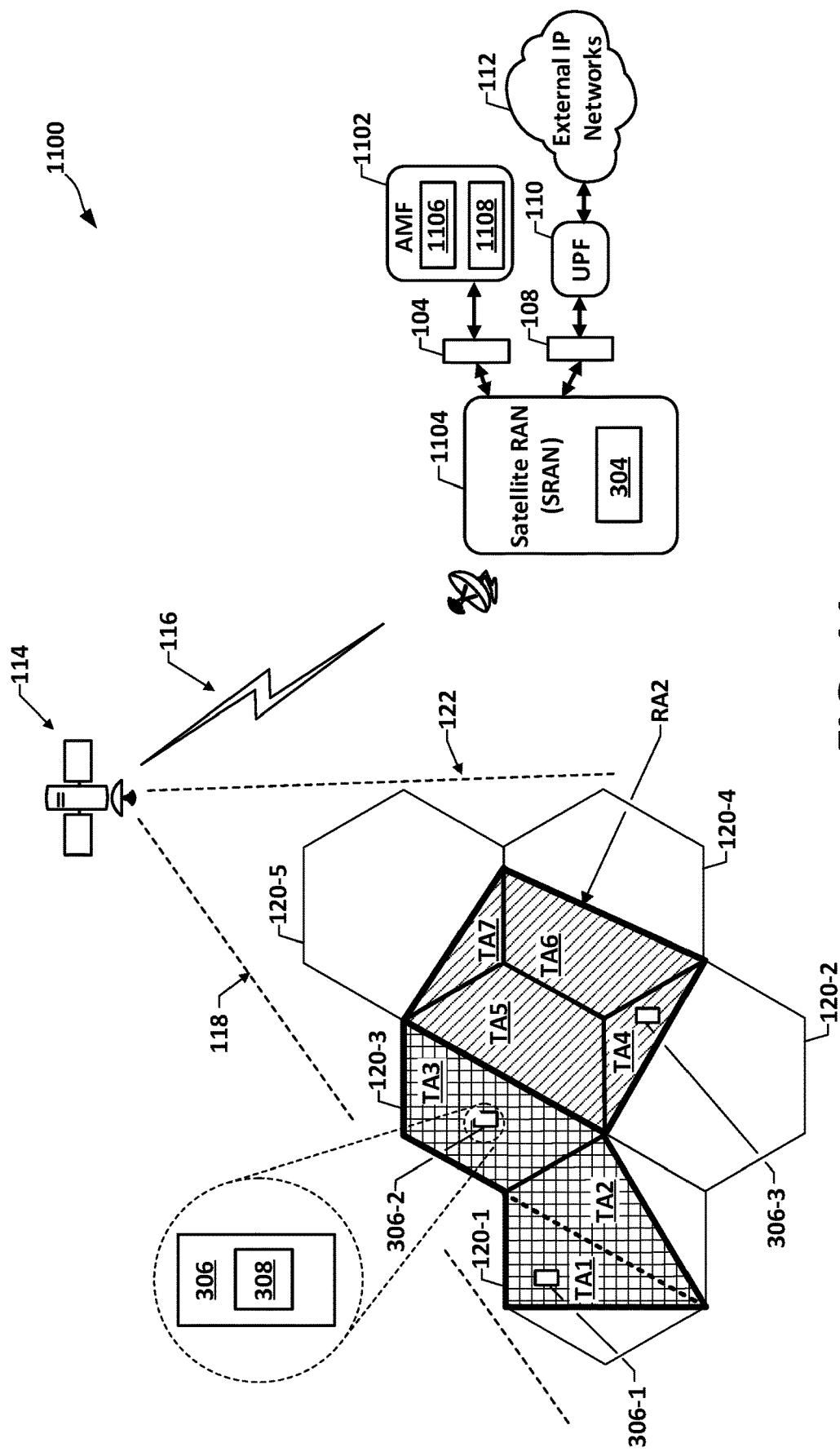
FIG. 11 is a block diagram for a system providing a TA-Level AMF paging control and resource conserving UT TA-level location tracking, and beam selective UT paging, in accordance with this disclosure.

FIG. 11 is a block diagram for a system 1100 for TA-Level AMF paging control for satellite-based 5G systems and methods for satellite resource conserving 5G paging. The FIG. 11 example implementation is described as a modification of system 300. The system 1100 can include, for example, in place of the system 300 AMF 106, a TA-Level UT Paging AMF 1102 and can include, for example, in place of the system 300 SB paging SRAN 302, a modified SB paging SRAN 1104. The TA-Level UT Paging AMF 1102 can be configured to include standard 5G-defined AMF features and functionalities, and to include an AMF S-TMSI-to-TA mapping logic 1106, and an AMF-based TA-inserted paging logic 1108. The AMF S-TMSI-to-TA mapping logic 1106 and AMF-based TA-inserted paging logic 1108 can be respectively implemented, for example and without limitation, as processor-executable instructions, e.g., logic table creation instructions and modified 5G paging instructions, stored in an instruction memory resource (not explicitly visible in FIG. 11) of a COTS-implemented 5G AMF. The instruction memory resource can be coupled to the COTS processor resource (not explicitly visible in FIG. 11) of the COTS-implemented 5G AMF. An example paging process by the system 1100 can be in accordance with the following modification of FIG. 4 flow 400: block 408 can be modified to carry the TA determined at 406; block 414 can be modified such that the SB SRAN 302 receives the subject RSC UT 306 TA in the page command, and block 416 can be modified such that the SB SRAN 302 determines the best beam based at least in part on the RSC UT 306's TA received at 414, as opposed to the SB SRAN 302's stored TA for the UT 306.

Figure 12:
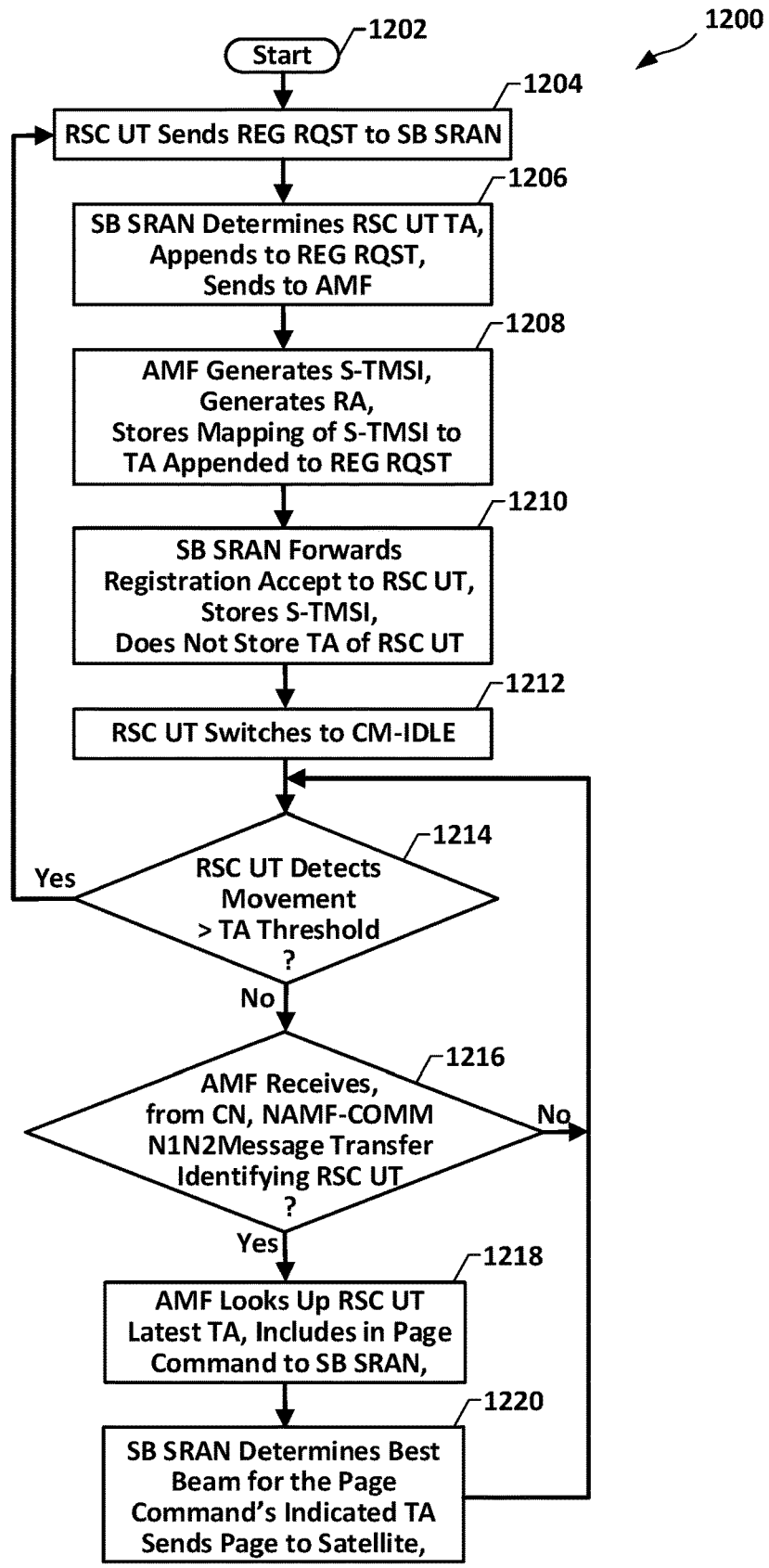
FIG. 12 is a flow diagram of operations in a process for TA-Level AMF paging control, in a process for resource conserving UT registration, TA-level location tracking, and beam selective paging, for satellite-based 5G systems and methods in accordance with this disclosure.

FIG. 12 is a flow diagram of a flow 1200 for operation in a process of TA-Level AMF paging control, for satellite-based 5G systems and methods for satellite resource conserving, beam-selective 5G paging in accordance with this disclosure. An example instance of the flow 1200 will be described in reference to FIGS. 11 and 12. In the example instance, operations can proceed from a start 1202 to 1204 upon a UT, such as the FIG. 11 RSC UT 306-1 (appearing as sending a REG RAST to the modified SB paging SRAN 1104 (appearing as "MSBP SRAN" in FIG. 12) having jurisdiction over the RSC UT 306's current cell. It will be assumed, for this example instance, that the modified SB paging SRAN 1104 and the TA-Level UT Paging AMF 1102 have jurisdiction over the RSC UT 306's current cell. Upon the modified SB paging SRAN 1104 receiving the REG RAST that the RSC UT 306 sent at 1206, the flow 1200 can proceed to 1206, where operations of the modified SB paging SRAN 1104 can determine the subject UT 306's current TA, append the determined TA to the REG RAST, and forward the REG RAST with the TA to the TA-Level UT Paging AMF 1102. In one or more implementations of TA-Level AMF paging control in accordance with this disclosure, the modified SB paging SRAN 1104 may be configured to not store the TA determined at 1206 or any association between the TA and the subject RSC UT 306. This can reduce processing load and memory requirements of the modified SB paging SRAN 1104.

After the modified SB paging SRAN 1104 forwards the REG RAST with appended TA to the TA-Level UT Paging AMF 1102, the flow 1200 can proceed from 1206 to 1208, where the TA-Level UT Paging AMF 1102, in response, can generate and send to the modified SB paging SRAN 1104 a REG accept having the S-TMSI and the RA assigned to the subject RSC UT 306. According to an aspect of TA-Level AMF paging control in accordance with this disclosure, the TA-Level UT Paging AMF 1102 can be configured to store, e.g., in association with the subject RSC UT 306 S-TMSI, the TA that block 1102 received with the REG RAST. The flow 1200 can proceed from 1208 to 1210 where the modified SB paging SRAN 1104 can forward the registration accept to the subject RSC UT 306.

At 1212, sometime after the subject RSC UT 306 receives the registration accept forwarded at 1210, and otherwise completes the registration process (not fully visible in FIG. 12), the subject RSC UT 306 can switch to the CM-IDLE state. The switch at 1212 can be associated, for example, with standard 5G UT inactivity-based state switching. While in the CM-IDLE state the subject RSC UT 306 can, for example as a background process, apply operations at 1214 to determine if the UT has moved more than a threshold distance from its previous location, e.g., such as described in reference to sequence 500, 512-516. The flow 1200 can also include reception operations 1216, at the TA-Level UT Paging AMF 1102, of a CN-core generated Namf_Comm_N1N2MessageTransfer associated, for example, with the CN having data for delivery to the subject RSC UT 306. The operations at 1216 can be configured, for example, as an interrupt-type service. It will be understood that the relative placements and arrangement of the FIG. 12 blocks 1214 and 1216 are arbitrary and are not intended to define or to imply any requisite timing, or any sequencing or dependency of operations implementing the blocks. Also, it will be understood that reception at 1216 is not necessarily conditioned on first applying operations at 1214.

For purposes of description it will be assumed that a Namf_Comm_N1N2MessageTransfer, invoking operations at 1216, occurs prior to a first instance of a detection at 1214 of an above-threshold movement of the UT 306. Operations at 1216 can include reading or extracting the UT identifier from the Namf_Comm_N1N2MessageTransfer, whereupon the flow 1200 can proceed to 1218, where operations of the TA-Level UT Paging AMF 1102 can determine the S-TMSI of the subject UT 306, for example, if the S-TMSI is not contained by the Namf_Comm_N1N2MessageTransfer. Operations at 1218 can then retrieve the UT 306's TA, using the determined S-TMSI and the UT S-TMSI to current TA mapping 1108. It will be understood that "determined S-TMSI," in the above-described context of determining the S-TMSI of the RSC UT 306 relating to the Namf_Comm_N1N2MessageTransferTA, can encompasses a two-layer mapping of UT S-TMSI to current TA, which can effect a direct mapping, from the form or protocol by which the Namf_Comm_N1N2MessageTransfer identifies the UT 306, to the UT 306's current TA stored at time of registration.

Upon operations at 1218, e.g., by the TA-Level UT Paging AMF 1102, of obtaining the UT 306's current TA, remaining operations at 1218 can complete the page command, in a configuration that carries the current TA of the UT 306 retrieved or looked up at 1218 and can send the page command to the modified SB paging RAN 1104. Upon the modified SB paging SRAN 1104 receiving the page command, the flow 1200 can proceed to 1220 where operations of the modified SB paging SRAN 1104 can include determining or selecting a best beam for paging the subject UT 306. When the determining or selecting operations at 1220 are completed, the modified SB paging SRAN 1104 can send the appropriate page command to the GEO satellite 114. Operations at 1220 of determining or selecting a best beam can be implemented, for example, by a TA-to-beam map or table (not separately visible in the figures).

In the above-described operations, the phrase "current TA of the RSC UT 306" is applied to the current TA obtained from the mapping stored at 1208. In the described example the Namf_Comm_N1N2MessageTransfer was received prior to a detection at 1214 of the RSC UT having moved beyond the threshold distance. In an illustrative continuation of the example above, after the described paging and transfer of data to the RSC UT 306 (not visible in FIG. 12), it will be assumed that such detection at 1214 occurs and, in response, the flow 1200 can proceed back to 1204, where the subject RSC UT 306 can send another REG RAST to the modified SB paging SRAN 1104. This flow 1200 can then repeat, basically, operations at 1206-1210. The repeat, though, may be mobility registration updating such as described above in reference to operations 702-716 in sequenced 700 and 800. In such operations, the subject UT 306 can be in the CM-IDLE state and, therefore, the "UT Switches to CM-IDLE" operation at 1212 can be omitted.

For a vehicular or otherwise mobile RSC UT, the UT can update its location by sending REG RAST to the SRAN, e.g., the SB paging SRAN 302 or the modified SB paging SRAN 1104 to initiate mobility registration updating such that the SRAN and the AMF have the UT's latest location or RA. A trigger for the RSC UT to send the location update can be based on the UT's travel distance. One implementation of such a trigger can be as follows: when the UT travels more than a threshold (TH) distance, e.g., TH kilometers, the RSC UT is triggered to update its location. In another implementation, a RSC UT can be configured to receive or otherwise be associated with a travel map, and to include a location update triggering configuration that can trigger the RSC UT to send updates of its location based, at least in part, on elapsed time. For example, for a RSC UT carried on an aircraft that flies according to a flight plan, the RSC UT can send the travel map, which includes the UT's projected speed, to the SRAN in advance. The SRAN can therefore estimate the RSC UT location in advance.

Example implementations according to this disclosure can be practiced in application environments that include adjacent countries covered by respectively different RAs. The assignment of respectively different RA for different countries can be needed, for example, for legal interception, billing and other purposes. Example implementations according to this disclosure can also be practiced in application environments wherein one or more countries receive more than one beam. In such a case, the country can be assigned multiple RAs, one RA for each beam.

Figure 13:
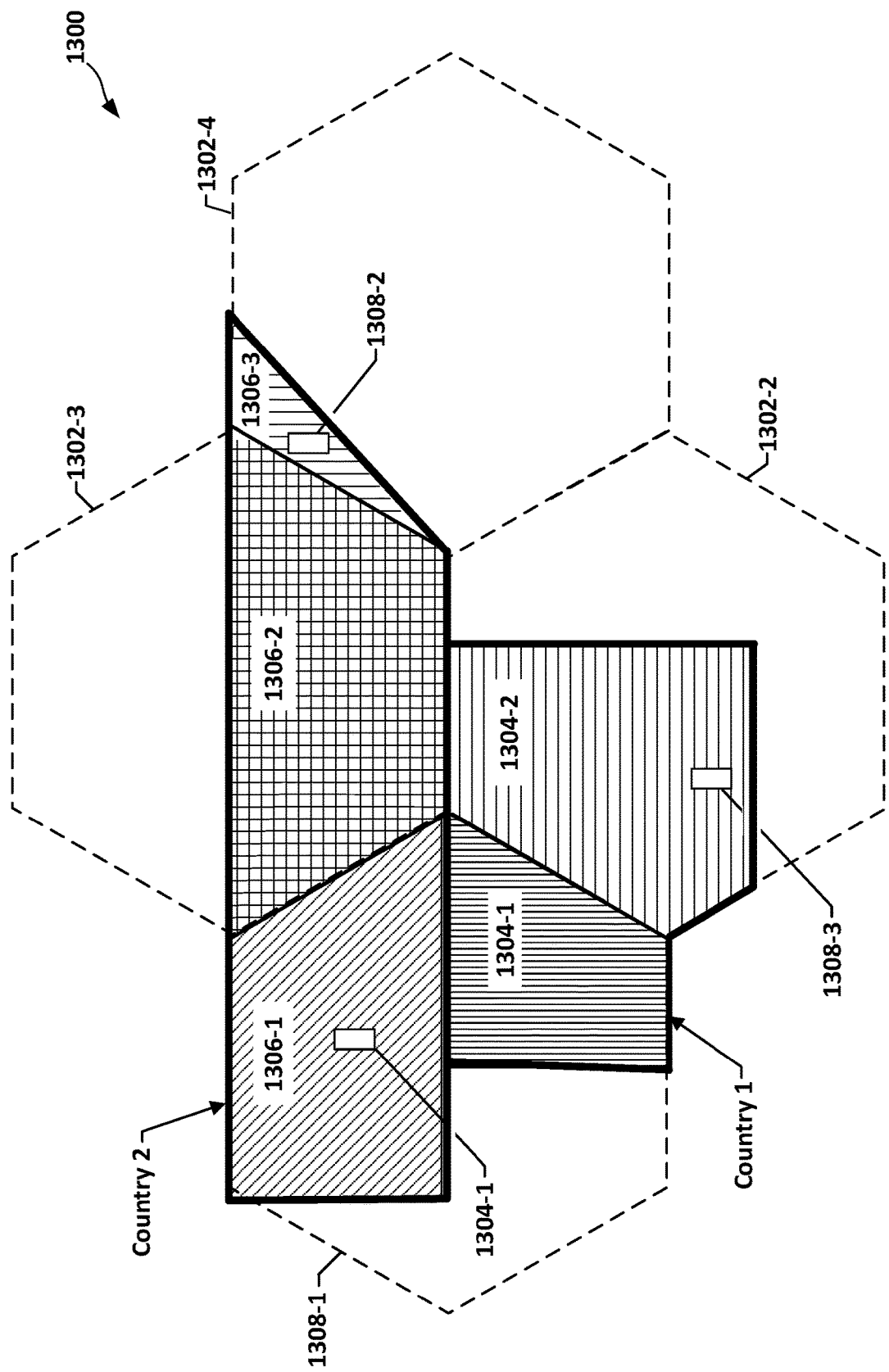
FIG. 13 illustrates countries covered by multiple satellite beams and corresponding multiple registration areas.

FIG. 13 shows such an environment 1300 having aspects that include a simulated or constructed hypothetical geographical area (visible but not collectively numbered) that can include a simulated or constructed hypothetical first country, labeled "Country 1," and adjacent Country 1 a simulated or constructed hypothetical second country, labeled "Country 2." The FIG. 13 environment also includes one or more satellites (not explicitly visible in FIG. 13), providing four beams, which are first beam 1302-1, second beam 1302-2, third beam 1302-3, and fourth beam 1302-4 (collectively referenced as "beams 1302"). Country 1 is covered by two of the beams 1302, which are first beam 1302-1 and second beam 1302-2. Country 2 is covered by three of the beams 1302, which are first beam 1302-1, third beam 1302-3, and fourth beam 1302-4.

In the FIG. 13 configuration, Country 1 is assigned two RAs, numbered respectively as 1304-1 and 1304-2 (collectively "first country RAs 1304"). RAs 1304-1 and 1304-2 will be alternatively referred to, respectively, as "first country first RA" 1304-1, and "first country second RA" 1304-2." As seen in FIG. 13, one of the first country RAs 1304 is assigned to each of the two beams covering Country 1, i.e., first country first RA 1304-1 is assigned to the first beam 1302-1, and first country second RA 1304-2 is assigned to the second beam 1302-2. Country 2 is assigned three (3) RAs, numbered respectively as 1306-1, 1306-2, and 1306-3 (collectively "second country RAs 1306"). RAs 1306-1, 1306-2, and 1306-3 will be alternatively referred to, respectively, as "second country first RA" 1306-1, "second country second RA" 1304-2, and second country third RA 1306-13." As shown in FIG. 13, one of the second country RAs 1306 is assigned to each of the three beams covering Country 2, i.e., second country first RA 1306-1 is assigned to first beam 1302-1, second country second RA 1306-2 is assigned to the third beam 1302-3, and second country third RA 1306-3 is assigned to the fourth beam 1302-4.

A first RSC UT 1308-1, is shown located in the second country first RA 1306-1, a second RSC UT 1308-2 is shown in second country third RA 1306-3, and a third RSC UT 1308-3 is shown in first country second RA 1304-2. In one or more paging processes according to this disclosure, paging to the first RSC UT 1308-1 will be sent only to the first beam 1302-1, since UT 1308-1 is in the second country first RA 1306-1 which is in beam 1302-1. Likewise, paging to the second RSC UT 1308-2 will be sent only to the fourth beam 1302-4 since the second RSC UT 1308-2 is in the second country third RA 1306-3 which is in the fourth beam 1302-4. Paging to the third RSC UT 1308-3 will be sent only to the second beam 1302-2 since RSC UT 1308-3 is in second country second RA 1306-2, which is in the second beam 1302-4. In each of the above-described pagings, the paging is sent to only one beam.

In practices in accordance with this disclosure, the SB paging 1302 will be updated, for example, by location reporting and re-registration processes provided by systems and methods described above in reference to one or more among FIGS. 3 through 12. Also in accordance with disclosed processes, systems, and methods, as UT 1308-1 and UT 1308-3 travels within Country 2, each will send a registration update when it moves from one of the country's RAs to the other.

As described above, in various mobility registration updating processes in accordance with terrestrial 5G systems, a UT can be required to determine, with a substantial frequency of execution, whether the UT has moved out of its registration area. A similar type issue, in terrestrial 5G systems, is that UTs can be required to transmit location reports or updates to the system RAN.

Figure 14:
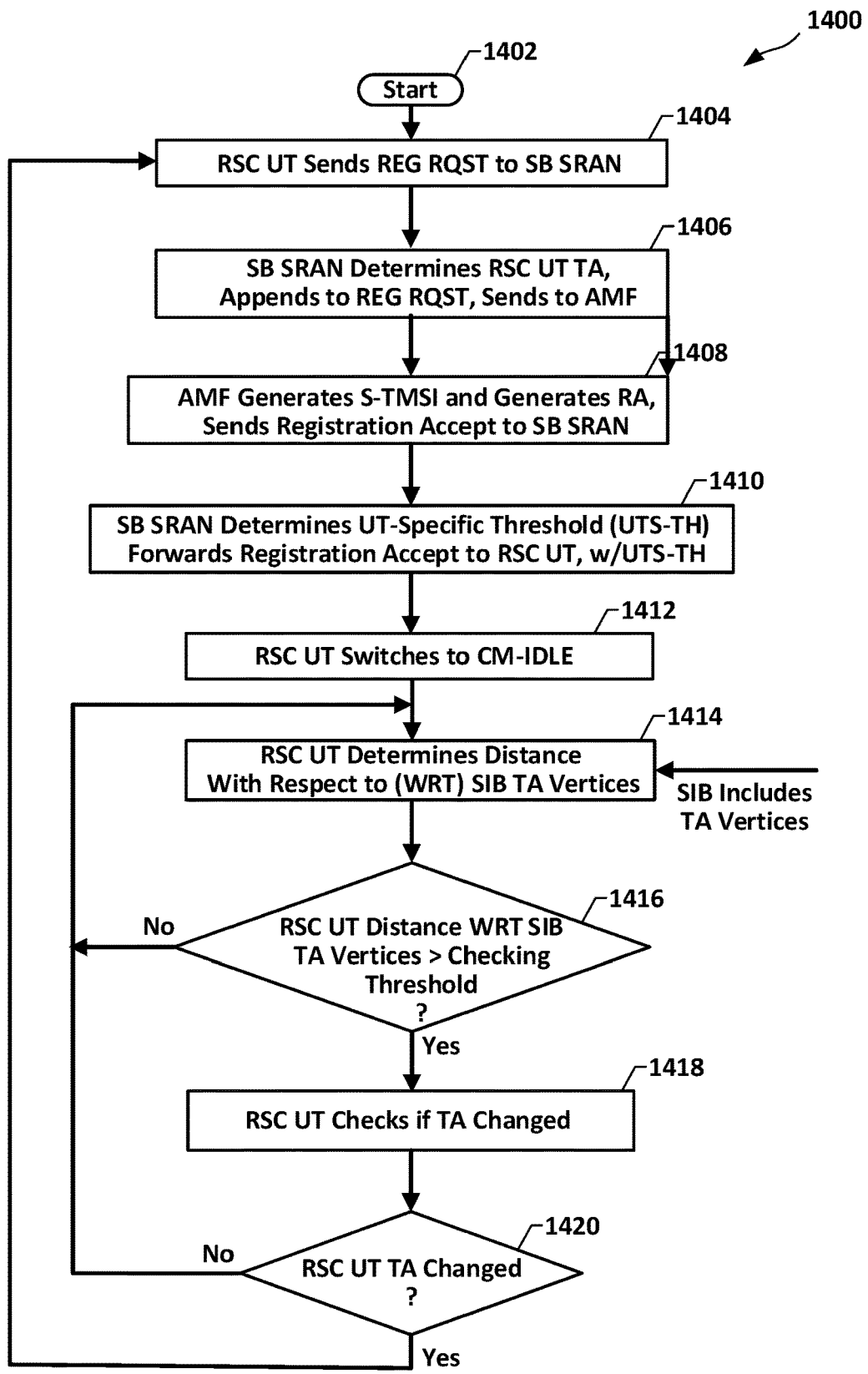
FIG. 14 is a flow diagram of a method for reduced UT and system overhead UT location reporting, for satellite-based 5G systems and methods for satellite resource conserving 5G paging in accordance with this disclosure.

FIG. 14 is a flow diagram of a flow 1400 in a process for reduced UT and system overhead UT location reporting, for satellite-based 5G systems and methods for satellite resource conserving 5G paging in accordance with this disclosure. Example operations in an instance of the flow 1400 will be described in reference to the FIG. 3 system 300. This is only for purposes of example and is not intended as a limitation regarding implementations and practices in accordance with this disclosure. For example, and without limitation, the operations described in reference to FIG. 3 can be adapted to the FIG. 11 system 1100.

In an example instance of the flow 1400, operations can begin with a RSC UT, such as any of the system 300 RSC UTs 306, proceeding from a start 1402 to 1404 where RSC UT operations can send, for example, a REG RAST to an available SB paging SRAN (appearing as "MSB SRAN" in FIG. 14) to register, for example, with the AMF having jurisdiction over the RSC UT 306's current cell. It will be assumed, for purposes of the present example, that the available SB paging SRAN is the SB paging SRAN 302 and the AMF having jurisdiction over RSC UT 306's current cell, is the AMF 106. Upon the SB paging SRAN 302 receiving the REG RAST the RSC UT 306 sent at 1404, the flow 1400 can proceed to 1406, where operations of the SB paging SRAN 302 can determine the subject RCS UT 306's current TA, append the determined TA to the REG RAST, and forward the REG RAST with TA to the AMF 106. The flow 1400 can then proceed from 1406 to 1408, where the AMF 106 can generate an S-TMSI and RA for the subject RSC UT 306, and send to the SB paging SRAN 302 a registration accept having the 5-TMSI and RA.

Upon the SB paging SRAN 302 receiving the registration accept sent at 1408, the flow 1400 can proceed to 1410, where the SB paging SRAN 302 can generate a UT-specific movement threshold UTS-TH and can send the registration accept, with UTS-TH, to the subject RSC UT 306. The UTS-TH value can be, for example, in terms of kilometers, miles, or any other distance metric. The distance metric can be absolute e.g., kilometers or miles, or can be a value normalized to another spacing. The UTS-TH value can be independent of direction, i.e., can define a circular perimeter.

In an aspect, UTH-TH value may define a perimeter having non-uniform distance from a center reference. The subject RSC UT 306 can store the UTS-TH value in its UT location detection/reporting logic 308.

In an aspect, operations at 1410 can include or can effect completion of initial registration of the subject RSC UT 306, whereupon the subject RSC UT 306 can be placed, for example, in the CM-CONNECTED state. Subsequent to the initial registration the now-registered subject RSC UT 306 can switch, as shown by operations 1412, from the CM-CONNECTED state to the CM-IDLE state, for example, due to inactivity of the RSC UT 306. The RSC UTs 306 can be configured such that each of the UT, after switching to the CM-IDLE state, can periodically apply RSC operations at 1414 that, based at least in part on UT receipt of SIBs carrying TA vertices, can determine present RSC UT distance or position, e.g., relative to the position at initial registration. From 1412 the flow 1400 can proceed to 1416 where the RSC UT location detection/reporting logic 308 of the RSC UT 306 can compare the distance or position determined at 1414 to the UTS-TH value. It will be understood that the meaning of "compared," in this context, does not necessarily require direct comparison of the determination at 1414 to the UTS-TH value. For example, operations at 1416 can be implemented using a measurement or extraction of a parameter value indicative of a relation between a determination at 1414 and the UTS-TH value, or using a scalar that can be computed based, in whole or on a determination at 1414. It will also be understood that operations at 1414 can be configured as estimation or classifier operations. For example, operations at 1414 can be configured as a binary classifier, between, e.g., "distance exceeded" and "distance not exceeded."

The flow 1400 can be configured such only upon a "Yes" determination at 1416 will the flow 14100 proceed to 1418 for the RSC UT 306 to determine if it has moved to a different changed TA. In such a configuration, if the determination at 1416 is "No," the flow 1400 can return to 1414. The return to 1414 can be direct or, for example, can be performed in accordance with a scheduling condition. Technical benefits of conditioning the RSC UT 306's determination of whether it has moved to a different TA on a distance threshold, as opposed to the RSC UT 306 applying periodic automatic determination, can include conservation of UT 306 processing resources, and conservation of UT 306 battery power.

In instances where the determination at 1416 is "Yes," the flow 1400 can proceed to 1418, where operations can determine if the subject RSC UT 306's TA has changed. If the determination at 1418 is that the TA has not changed the flow 1400 can return, as shown by the "No" outbranch of flow decision block 1420, back to 1414. If the determination at 1418 is that the TA has changed, flow 1400 can proceed, as shown by the "Yes" outbranch of flow decision block 1420, back to 1404 to re-register.

Figure 15:
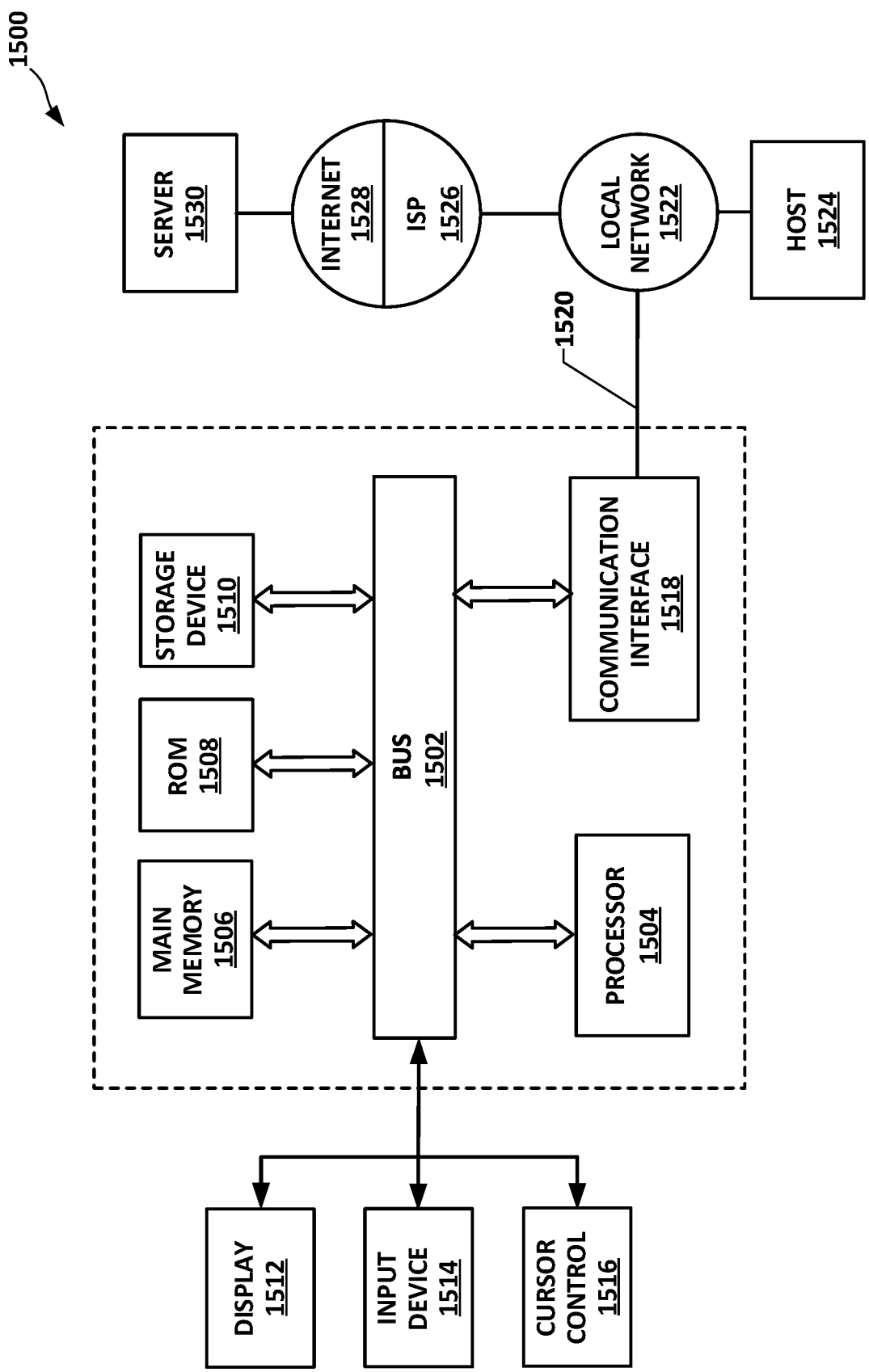
FIG. 15 is a block diagram showing an example computer system upon which aspects of this disclosure may be implemented.

FIG. 15 is a block diagram showing an example a computer system 1500 upon which aspects of this disclosure may be implemented. It will be understood that functional blocks illustrated in FIG. 15 are logical blocks, and do not necessarily correspond to particular hardware.

The computer system 1500 may include a bus 1502 or other communication mechanism for communicating information, and a processor 1504 coupled with the bus 1502 for processing information. The computer system 1500 may also include a main memory 1506, such as a random-access memory (RAM) or other dynamic storage device, coupled to the bus 1502 for storing information and executable instructions to be executed by the processor 1504. The executable instructions can include instruction that, when executed by the processor 1504, cause the processor to perform operations in accordance with the flow diagrams of FIGS. 4, 12, and 13 sequence diagrams of FIGS. 4-10, and FIGS. 12-14. The main memory 1506 may also be used for storing temporary variables or other intermediate information during execution of instructions to be executed by the processor 1504. The computer system 1500 may implement, for example, UT, SRAN, AMF, UPF, etc.

The computer system 1500 may further include a read only memory (ROM) 1508 or other static storage device coupled to the bus 1502 for storing static information and instructions for the processor 1504. A storage device 1510, such as a flash or other non-volatile memory may be coupled to the bus 1502 for storing information and instructions.

The computer system 1500 may be coupled via the bus 1502 to a display 1512, such as a liquid crystal display (LCD), for displaying information. One or more user input devices, such as the example user input device 1514 may be coupled to the bus 1502, and may be configured for receiving various user inputs, such as user command selections and communicating these to the processor 1504, or to the main memory 1506. The user input device 1514 may include physical structure, or virtual implementation, or both, providing user input modes or options, for controlling, for example, a cursor, visible to a user through display 1512 or through other techniques, and such modes or operations may include, for example virtual mouse, trackball, or cursor direction keys.

The computer system 1500 may include respective resources of the processor 1504 executing, in an overlapping or interleaved manner, respective program instructions. Instructions may be read into the main memory 1506 from another machine-readable medium, such as the storage device 1510. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 1510. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The computer system 1500 may also include a communication interface 1518 coupled to the bus 1502, for two-way data communication coupling to a network link 1520 connected to a local network 1522. The network link 1520 may provide data communication through one or more networks to other data devices. For example, the network link 1520 may provide a connection through the local network 1522 to a host computer 1524 or to data equipment operated by an Internet Service Provider (ISP) 1526 to access through the Internet 1528 a server 1530, for example, to obtain code for an application program.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

What is claimed is:

1. A radio access network (RAN) comprising:
a processor; and
a memory communicatively connected to the processor and storing executable instructions that, when executed by the processor, cause the processor to:
receive a registration request via a satellite in the RAN from a user terminal (UT) and in response:
determine a current tracking area (TA) in which the UT is located, based at least in part on a content of the registration request, and
send the registration request and an identification of the current TA to an access and mobility management function (AMF) device;
receive a registration accept from the AMF device and, in response, forward the registration accept to the UT, the registration accept indicating a registration area for the UT; and
receive from the AMF device a UT page command and, in response:
determine a satellite beam for paging the UT, from among a plurality of satellite beams, based at least in part on the identifier of the current TA, and
page the UT on said satellite beam for paging the UT;
wherein the content of the registration request includes an indication of a beam in which the UT is currently located,
the executable instructions include executable instructions that, when executed by the processor:
receive, in association with receiving the registration request from the UT, an indication of a reception beam, the reception beam being among the plurality of satellite beams, and being the satellite beam on which the registration request was received, and
determine the current TA in which the UT is located, based at least in part on said indication of the cell/beam in which the UT is currently located, in combination with the indication of the reception beam.

2. The RAN of claim 1, wherein the executable instructions further include instructions that, when executed by the processor, cause the processor, prior to receiving the registration request and in response to receiving a location report that includes a current cell geolocation of the UT, to:
determine the current TA in which the UT is located, based at least in part on mapping the geolocation of the UT to a corresponding tracking area among a plurality of tracking areas, and
send to the UT a location response, the location response including the identification of the current TA,
wherein the content of the registration request includes the identification of the current TA.

3. The RAN of claim 1, wherein the registration accept includes a temporary identifier for the UT, and wherein the executable instructions further include instructions, that when executed by the processor, cause the processor to:
send the temporary identifier to the UT, in association with sending the registration accept to the UT;
receive a location report from the UT, the location report including the temporary identifier and, in response:
determine an updated current TA in which the UT is located, based at least in part on a content of the location report, and
send to the UT a location response, the location response including or indicating the identification of the updated current TA.

4. The RAN of claim 1, wherein the executable instructions further include instructions that, when executed by the processor, cause the processor to:
store a mapping of TAs to satellite beams, and
wherein:
the UT page command includes the identification of the current TA, and determining the satellite beam for paging the UT includes:
extracting the identification of the current TA from the UT page command, and
applying the extracted identification of the current TA to the mapping of TAs to satellite beams.

5. The RAN of claim 4, wherein the registration accept includes a temporary identifier for the UT, and wherein the executable instructions further include instructions that, when executed by the processor, cause the processor to retain no copy and no record of the identification of the current TA sent to the AMF with the registration request.

6. A method for satellite-based 5G resource conservational paging, comprising:
receiving, by a satellite radio access network (SRAN), a registration request from a user terminal (UT);
determining a current tracking area (TA) in which the UT is located, based at least in part on a content of the registration request;
sending, from the SRAN to an access and mobility management function (AMF) device, the registration request and an identification of the current TA;
receiving a registration accept from the AMF, indicating a registration area for the UT, and forwarding the registration accept to the UT;
receiving from the AMF device a UT page command and, in response,
determining a satellite beam for paging the UT, from among a plurality of satellite beams, based at least in part on the identifier of the current TA, and
paging the UT on said satellite beam for paging the UT;
storing a mapping of TAs to satellite beams,
wherein:
the UT page command includes the identification of the current TA, and determining the satellite beam for paging the UT includes:
extracting the identification of the current TA from the UT page command, and
applying the extracted identification of the current TA to the mapping of TAs to satellite beams.

7. A method according to claim 6, wherein the registration accept includes a temporary identifier for the UT, and wherein the method further comprises:
sending the temporary identifier to the UT, in association with sending the registration accept to the UT;
receiving a location report from the UT, the location report including the temporary identifier and, in response:
determining an updated current TA in which the UT is located, based at least in part on a content of the location report.

8. A method according to claim 6, wherein the method further comprises:
receiving at the UT a system information broadcast (SIB) that includes vertices of a current tracking area in which the UT is located;
receiving at the UT a geolocation data indicating a geolocation of the UT;
determining the cell in which the UT is located, based at least in part on a combination of the vertices of the current tracking area and the geolocation data; and generating, at the UT, the registration request, the registration request including an identification of the cell in which the UT is located.

9. A method according to claim 8, wherein the method further comprises:
sending to the SRAN, in association with receiving the registration request from the UT, an indication of a reception beam, the reception beam being among the plurality of satellite beams, and being the satellite beam on which the registration request was received, wherein
determining the TA in which the UT is located is based at least in part on a combination of the indication of the reception beam on which the registration request was received and the on a content of the registration request and the identification of the cell in which the UT is located.

10. A method according to claim 8, wherein the method further comprises:
determining a distance, based at least in part on the geolocation data, between the UT and a reference location, the reference location being based at least in part on one or more of the vertices; and
based at least in part on the distance exceeding a movement threshold:
performing an update determination of the current TA, and
based at least in part on a result of the update determination of the current TA indicates the current TA of the UT is not included in the registration area, sending a mobility registration updating request from the UT to the AMF.

11. A method according to claim 10, wherein determining, based at least in part on the result of the update determination of the current TA, whether the UT has moved outside of the registration area includes:
determining, based at least in part on the result of the update determination of the current TA, whether the current TA of the UT is not included in the registration area indicated by the registration accept, and
determining, based at least in part on determining that the current TA of the UT is not included in the registration area, that the UT has moved outside of the registration area.

12. A method according to claim 6, further comprising:
receiving, at the AMF, the registration request and identification of the current TA; and
generating, at the AMF, the registration accept, based at least in part on the registration request and identification of the current TA.

13. A method according to claim 12, wherein the method further comprises:
storing at the AMF the identification of the current TA;
storing, at the AMF, in a configuration retrievable by the AMF, a mapping of the UT to the identification of the current TA; and
receiving, at the AMF, a 5G message transfer that indicates the UT and, in response,
retrieving the identification of the current TA from the mapping of the UT to the identification of the current TA temporary identifier,
generating the UT page command, with a configuration that includes the identification of the current TA, and
sending to the SRAN the UT page command, with the configuration that includes the identification of the current TA.

14. A method according to claim 13, wherein the 5G message transfer is a Namf_Comm_N1n2MessageTransfer.

15. A method according to claim 6, wherein determining the satellite beam for paging the UT includes:
extracting, at the SRAN, the identification of the current TA from the UT page command, and
applying the extracted identification of the current TA to a mapping of TAs to satellite beams.

16. A method according to claim 6, wherein the method further comprises:
retaining no copy and no record, in the SRAN, of the identification of the current TA sent to the AMF with the registration request.

17. A method according to claim 6, wherein:
determining the satellite beam for paging the UT, from among the plurality of satellite beams, is based at least in part on a mapping of TAs to satellite beams.

* * * * *